(12) United States Patent
Roatis et al.

(10) Patent No.: US 8,643,487 B2
(45) Date of Patent: Feb. 4, 2014

(54) ELECTRONIC SECURITY SYSTEM FOR MONITORING MECHANICAL KEYS AND OTHER ITEMS

(75) Inventors: Calin V. Roatis, Long Grove, IL (US); William D. Denison, Lake Zurich, IL (US); Gary L. Myers, Monee, IL (US)

(73) Assignee: TriTeq Lock and Security, LLC, Elk Grove, IL (US)

( * ) Notice: Subject to any disclaimer, the term of this patent is extended or adjusted under 35 U.S.C. 154(b) by 0 days.

(21) Appl. No.: 13/556,982

(22) Filed: Jul. 24, 2012

(65) Prior Publication Data

US 2013/0021156 A1 Jan. 24, 2013

Related U.S. Application Data

(60) Division of application No. 11/111,559, filed on Apr. 21, 2005, now abandoned, which is a continuation-in-part of application No. 11/010,661, filed on Dec. 13, 2004, now Pat. No. 7,373,352.

(60) Provisional application No. 60/528,831, filed on Dec. 11, 2003.

(51) Int. Cl.
| | |
|---|---|
| *G08B 13/00* | (2006.01) |
| *G08B 29/00* | (2006.01) |
| *B60R 25/00* | (2013.01) |
| *G05B 19/00* | (2006.01) |
| *G05B 23/00* | (2006.01) |
| *G06F 7/00* | (2006.01) |
| *G06F 7/04* | (2006.01) |
| *G08C 19/00* | (2006.01) |
| *H04B 1/00* | (2006.01) |
| *H04B 3/00* | (2006.01) |
| *H04Q 1/00* | (2006.01) |
| *H04Q 9/00* | (2006.01) |

(52) U.S. Cl.
USPC .......................................... 340/541; 340/5.73

(58) Field of Classification Search
USPC ............ 340/5.6, 5.61, 5.64, 5.65, 5.66, 5.73, 340/540, 541
See application file for complete search history.

(56) References Cited

U.S. PATENT DOCUMENTS

| | | | |
|---|---|---|---|
| 3,733,861 A | 5/1973 | Lester | |
| 4,031,434 A | 6/1977 | Perron et al. | |
| 4,053,939 A | 10/1977 | Nakauchi et al. | |
| 4,167,104 A | 9/1979 | Bond | |
| 4,205,325 A | 5/1980 | Haygood et al. | |
| 4,206,491 A | 6/1980 | Ligman et al. | |
| 4,268,076 A | 5/1981 | Itoi | |
| 4,353,064 A | 10/1982 | Stamm | |
| 4,354,189 A | 10/1982 | Lemelson | |

(Continued)

*Primary Examiner* — Jennifer Mehmood
*Assistant Examiner* — Yong Hang Jiang
(74) *Attorney, Agent, or Firm* — Miller, Matthias & Hull LLP

(57) ABSTRACT

A security system with a security container and an electronic lock circuit is used to securely store mechanical keys or other valuable items. Items to be protected are placed in a secured location in the security container. A detector of the security system detects whether the items are indeed in the secured location, such as by means of receiving signals from a transponder attached to the items. The security container is locked only if the items are detected to be in the secured location. Audit trail records for the locking and unlocking events of the security container may be transmitted to a device remote to the security container for analysis. A monitoring device with a location identification device, such as a GPS sensor, may be attached to items to be monitored for tracking locations and activities of the items.

47 Claims, 38 Drawing Sheets

(56) References Cited

U.S. PATENT DOCUMENTS

| | | |
|---|---|---|
| 4,369,442 A | 1/1983 | Werth et al. |
| 4,391,204 A | 7/1983 | Mitchell et al. |
| 4,509,093 A | 4/1985 | Stellberger |
| 4,594,637 A | 6/1986 | Falk |
| 4,670,747 A | 6/1987 | Borras et al. |
| 4,672,375 A | 6/1987 | Mochida et al. |
| 4,674,454 A | 6/1987 | Phairr |
| 4,688,036 A | 8/1987 | Hirano et al. |
| 4,703,359 A | 10/1987 | Rumbolt et al. |
| 4,709,202 A | 11/1987 | Koenck et al. |
| 4,720,700 A | 1/1988 | Siebold et al. |
| 4,727,369 A | 2/1988 | Rode et al. |
| 4,746,919 A | 5/1988 | Reitmeier |
| 4,760,393 A | 7/1988 | Mauch |
| 4,766,746 A | 8/1988 | Henderson et al. |
| 4,779,090 A | 10/1988 | Micznik et al. |
| 4,791,280 A | 12/1988 | O'Connel et al. |
| 4,811,012 A | 3/1989 | Rollins et al. |
| 4,827,395 A | 5/1989 | Anders et al. |
| 4,829,290 A | 5/1989 | Ford |
| 4,829,296 A | 5/1989 | Clark et al. |
| 4,839,669 A | 6/1989 | Sato et al. |
| 4,857,914 A | 8/1989 | Thrower |
| 4,918,431 A | 4/1990 | Borras et al. |
| 4,926,996 A | 5/1990 | Eglise et al. |
| 4,942,393 A | 7/1990 | Waraksa et al. |
| 4,952,864 A | 8/1990 | Pless |
| 4,967,305 A | 10/1990 | Murrer |
| 5,021,776 A | 6/1991 | Anderson |
| 5,043,720 A | 8/1991 | Laurienzo |
| 5,065,356 A | 11/1991 | Puckett |
| 5,090,222 A | 2/1992 | Imran |
| 5,109,530 A | 4/1992 | Stengel |
| 5,113,182 A | 5/1992 | Suman et al. |
| 5,140,317 A | 8/1992 | Hyatt, Jr. et al. |
| 5,184,855 A | 2/1993 | Waltz et al. |
| 5,245,329 A | 9/1993 | Godcebay |
| 5,280,518 A | 1/1994 | Danler et al. |
| 5,280,527 A | 1/1994 | Gullman et al. |
| 5,337,588 A | 8/1994 | Chhatwal |
| 5,339,250 A | 8/1994 | Durbin |
| 5,343,077 A | 8/1994 | Yoshida et al. |
| 5,347,267 A | 9/1994 | Murray |
| 5,347,419 A | 9/1994 | Caron et al. |
| 5,349,345 A | 9/1994 | Vanderschel |
| 5,389,919 A | 2/1995 | Warren et al. |
| 5,392,025 A | 2/1995 | Figh et al. |
| 5,394,718 A | 3/1995 | Holtz |
| 5,473,236 A | 12/1995 | Frolov |
| 5,473,318 A | 12/1995 | Martel |
| 5,475,375 A | 12/1995 | Barrett et al. |
| 5,477,041 A | 12/1995 | Miron et al. |
| 5,479,151 A | 12/1995 | Lavelle et al. |
| 5,506,575 A | 4/1996 | Ormos |
| 5,552,777 A | 9/1996 | Gokcebay et al. |
| 5,561,420 A | 10/1996 | Kleefeldt et al. |
| 5,575,515 A | 11/1996 | Iwamoto et al. |
| 5,602,536 A | 2/1997 | Henderson et al. |
| 5,617,082 A | 4/1997 | Denison et al. |
| 5,625,338 A | 4/1997 | Pilder et al. |
| 5,625,349 A | 4/1997 | Disbrow et al. |
| 5,636,881 A | 6/1997 | Stillwagon |
| 5,661,470 A | 8/1997 | Karr |
| 5,673,034 A | 9/1997 | Saliga et al. |
| 5,686,902 A | 11/1997 | Reis et al. |
| 5,742,238 A | 4/1998 | Fox |
| 5,745,044 A | 4/1998 | Hyatt, Jr. et al. |
| 5,767,792 A | 6/1998 | Urbas |
| 5,771,722 A | 6/1998 | DiVito et al. |
| 5,774,053 A | 6/1998 | Porter |
| 5,774,058 A | 6/1998 | Henry et al. |
| 5,774,059 A | 6/1998 | Henry et al. |
| 5,805,074 A | 9/1998 | Warren et al. |
| 5,813,257 A | 9/1998 | Claghorn et al. |
| 5,841,866 A | 11/1998 | Bruwer et al. |
| 5,873,276 A | 2/1999 | Dawson et al. |
| 5,886,644 A | 3/1999 | Keskin et al. |
| 5,894,277 A | 4/1999 | Keskin et al. |
| 6,005,487 A | 12/1999 | Hyatt, Jr. et al. |
| 6,038,491 A | 3/2000 | McGarry et al. |
| 6,068,305 A | 5/2000 | Myers et al. |
| 6,130,602 A | 10/2000 | O'Toole et al. |
| 6,211,747 B1 | 4/2001 | Trichet |
| 6,219,700 B1 | 4/2001 | Chang |
| 6,318,137 B1 | 11/2001 | Chaum |
| 6,345,522 B1 | 2/2002 | Stillwagon et al. |
| 6,359,547 B1 | 3/2002 | Denison et al. |
| 6,384,709 B2 | 5/2002 | Mellen et al. |
| 6,401,059 B1 | 6/2002 | Shen et al. |
| 6,437,740 B1 | 8/2002 | De Champlain et al. |
| 6,483,424 B1 | 11/2002 | Bianco |
| 6,496,101 B1 | 12/2002 | Stillwagon |
| 6,525,644 B1 | 2/2003 | Stillwagon |
| 6,575,504 B2 | 6/2003 | Roatis et al. |
| 6,581,986 B2 | 6/2003 | Roatis et al. |
| 6,584,309 B1 | 6/2003 | Whigham |
| 6,684,671 B2 | 2/2004 | Beylotte et al. |
| 6,725,138 B2 | 4/2004 | DeLuca et al. |
| 6,867,685 B1 | 3/2005 | Stillwagon |
| 6,874,828 B2 | 4/2005 | Roatis et al. |
| 6,900,720 B2 | 5/2005 | Denison et al. |
| 6,975,202 B1 | 12/2005 | Rodriguez et al. |
| 6,977,576 B2 | 12/2005 | Denison et al. |
| 7,145,434 B2 | 12/2006 | Mlynarczyk et al. |
| 7,295,100 B2 | 11/2007 | Denison et al. |
| 7,456,725 B2 | 11/2008 | Denison et al. |
| 7,482,907 B2 | 1/2009 | Denison et al. |
| 7,495,543 B2 | 2/2009 | Denison et al. |
| 2002/0014950 A1 | 2/2002 | Ayala et al. |
| 2002/0024418 A1 | 2/2002 | Ayala et al. |
| 2002/0133716 A1 | 9/2002 | Harif |
| 2003/0127866 A1 | 7/2003 | Martinez et al. |
| 2003/0128101 A1 | 7/2003 | Long |
| 2004/0174264 A1 | 9/2004 | Reisman et al. |
| 2004/0178885 A1 | 9/2004 | Denison et al. |
| 2005/0024227 A1 | 2/2005 | Dunstan |
| 2005/0212656 A1 | 9/2005 | Denison et al. |
| 2005/0231365 A1 | 10/2005 | Tester et al. |
| 2007/0164324 A1 | 7/2007 | Denison et al. |

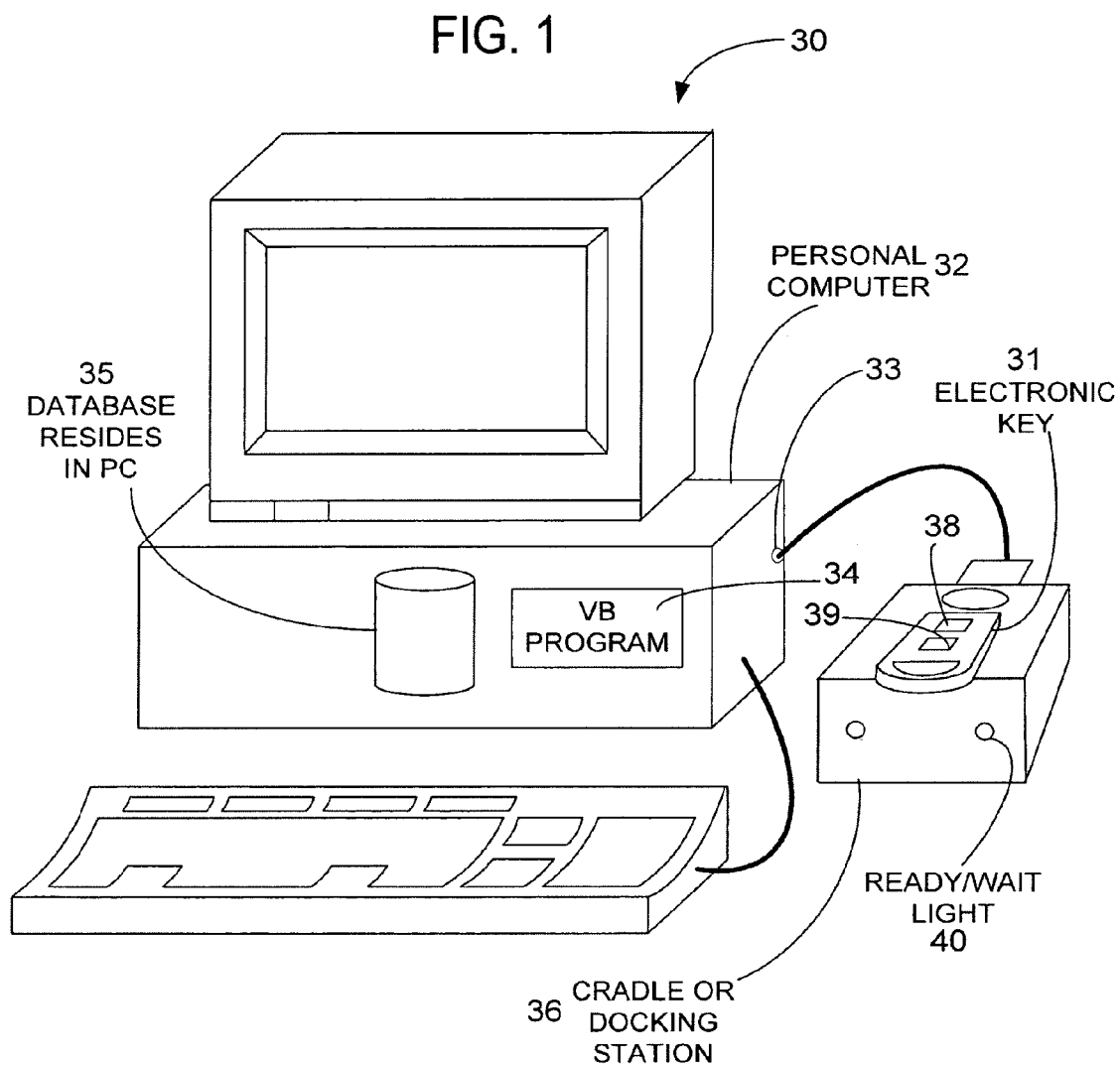

FIG. 2A

43 — Software Registration Menu

42

Enter Cradle Label#     CD Software Label:      Check this box
                                                If you are an
                                                independent Bottler Name:           Business Unit (If applicable):

Market Unit (If applicable):

Contract Name: First and Last:   Address:

City, State                      ZIP

Phone: xxx-xxx-xxxx              Fax: xxx-xxx-xxxx

44

Email:                           Step 1. Click here After
                                 Entering Above

[Generate System ID#]  [Back]

Step 2. If this station is connected to a printer,
click on *Get Registration button to print out    Step 3 Click Here After
your registration, if not, write down all info    Receiving Registration #
Shown here and fax it to: 847-640-7008

45 — [Get Registration #]                         [Go Next]

REGISTRATION
Number appears

FIG. 3A

Enter Password ☒

58 → Password　　　　&&&&&

OK　　　　　　Cancel

---

AutoTraq PC Interface V-6.5 ☒

File  AuditTrails  Edit  Key  Limits  Lock  Utilities  Routes  Tools  Mode

Name　[　　　]　　　　Key Type [　]

Key ID　[　　　]

60 →

Accesses Allowed　[　　　]　　Start Time [　]

Accesses Per Day　[　　　]　　Stop Time [　]

Refresh Days　[　　　]

Expires on　[　　　　　　　　　　　]

Days Valid　[　　　]

☐ Cradle Ready for Key FOB

[ E_XIT ]　　[ Audit Trails ]　　[ _Clear Form ]

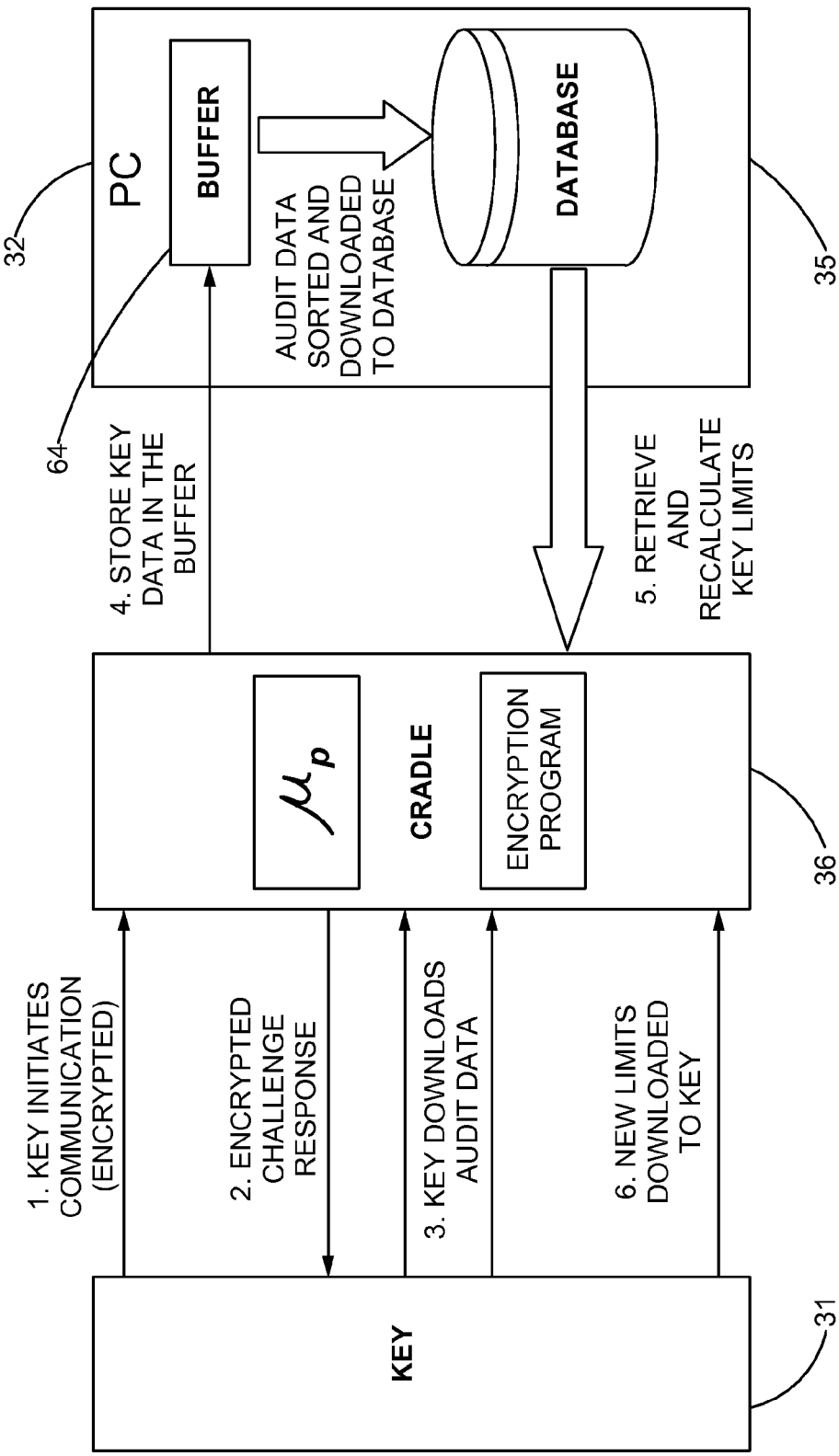

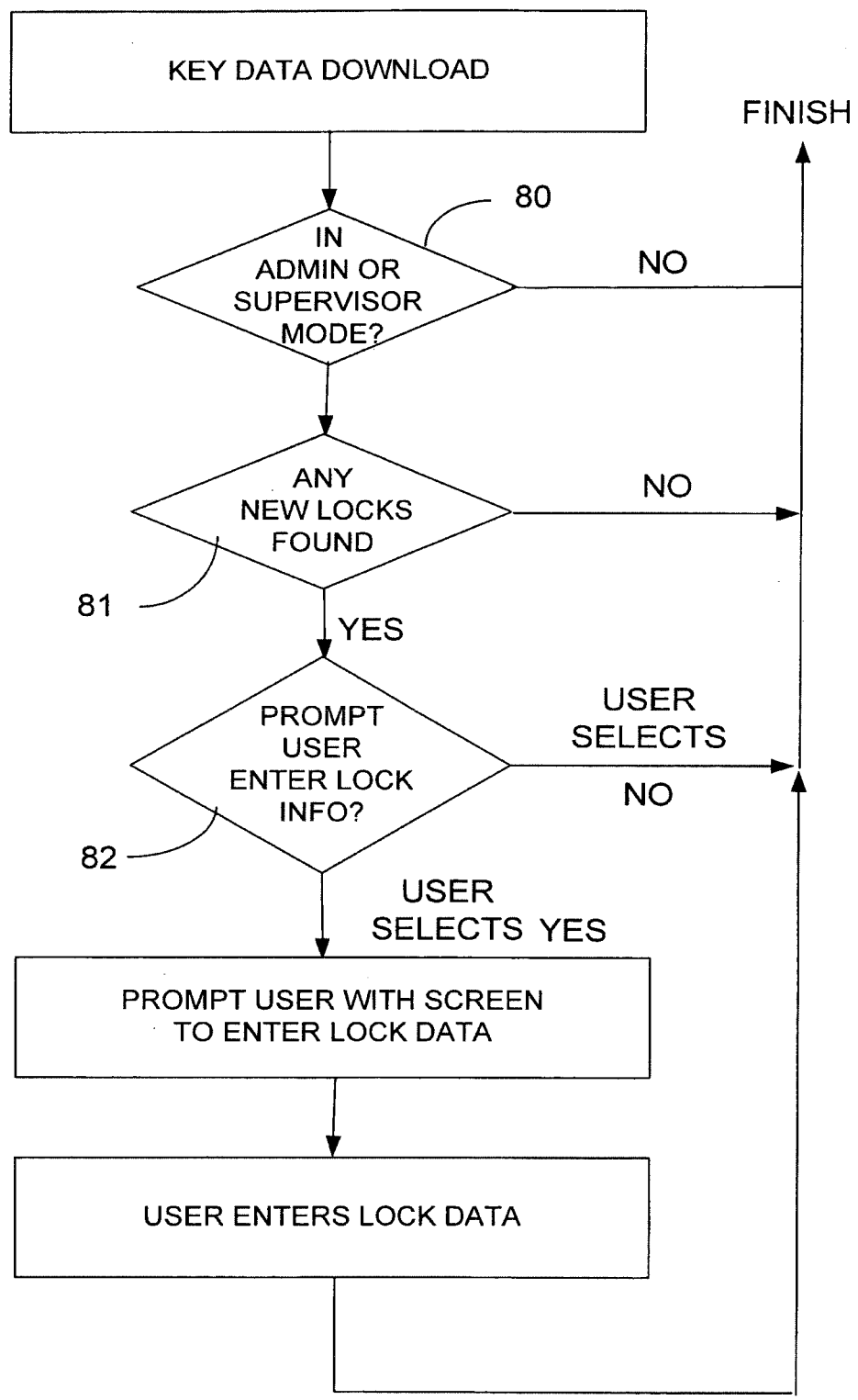

FIG. 5B

NEW ZONE KEY

90 — Cancel | Assign to New User (93) | Assign to Existing User (94)

Refresh Days: [ ]
Expires on: [ ]
Days Valid: [ ]

[ ] Reading number of ATs

EXIT | Audit Trails | Clear Form

Key Registration Form

96 —

| Name | Gary Meyers |
| Address | 701 Gullo Ave. |
| City | Elk Grove |
| Zip Code | 60007 |
| Phone | 847-1234-567 |
| Key ID | ABA0004 |

Cancel | Accept

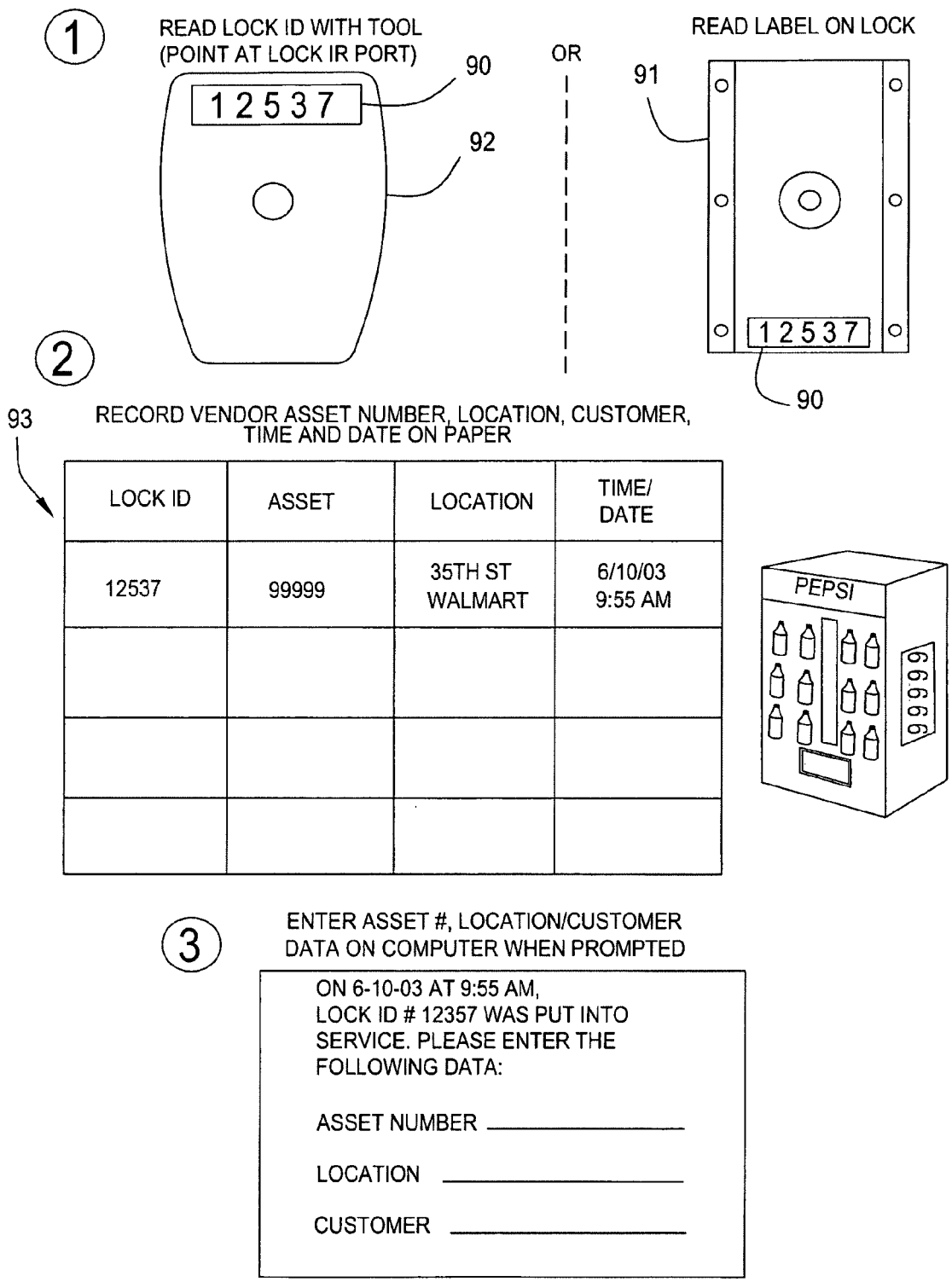

FIG. 6B

New Lock Detected

Lock upgraded to AUTOTRAQ

Time        11/7/02 9:10:00 Am

Lock Serial Number    1207455

[Exit]    [Enter Lock Information]

100

⬇

Auto New Lock Utility

| | |
|---|---|
| Lock Serial Number | 1207455 |
| Vendor Asset Number | Machine 5 |
| Customer Name | TriTeq Drugstore |
| Route Number | |
| Date in Service | |
| Street Address | 2301 Ravinia Way |
| City | Glenview |
| State/Zip | IL |
| Location | 1 |

102

[Exit]    [Update Lock Information]

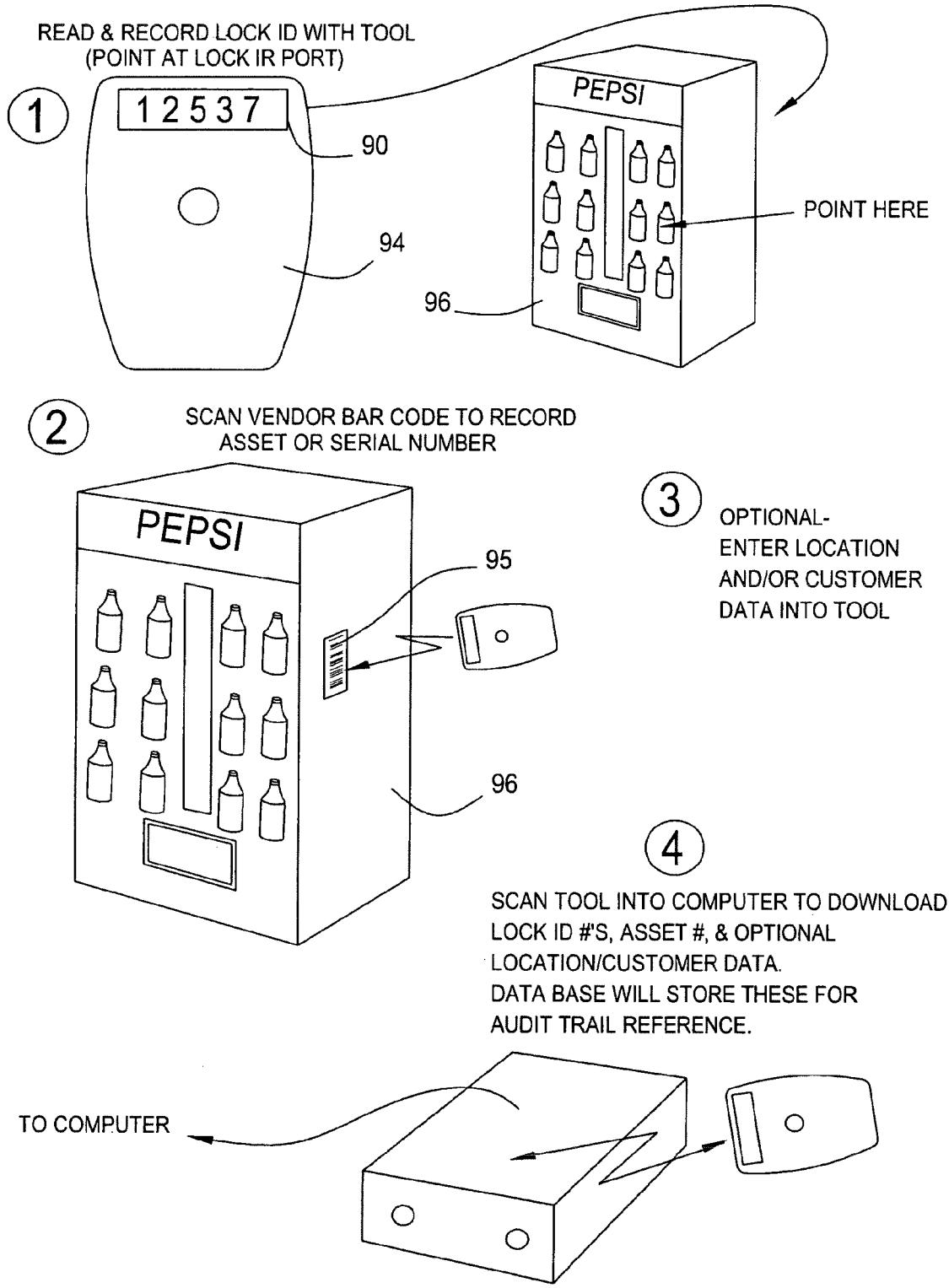
FIG. 6C — RECORDING LOCK ID# & VENDOR DATA ELECTRONIC PROCESS

FIG. 8

Administrator Logged in:

126 — File | AuditTrails | Edit Key Limits | Customer/Lock Info | Routes | Tools | Mode | Help Display AT Only for KEY FOBS starting with: AB

| Field | Value | Field | Value |
|---|---|---|---|
| Name | Art Tefissial | Key Type | Full Serve -FS |
| Key ID | ABA5011 | | |
| Total Accesses | 300 | Start Time | 8:00 am |
| Accesses Per Day | 60 | Stop Time | 5:00 pm |
| Refresh Days | 7 | | |
| Expires on | 11/14/02 12:00:00 AM | | |
| Days Valid | MTWTF | | |

At: ☐ Cradle Ready for Key FOB

REFRESHED FOR ABA5011
Art Tefissial

[EXIT]  [Audit Trails]  [Clear Form]

128

| NAME | KEY CODE | ASSET # | CUSTOMER NAME | DATE/TIME | ACTIVITY |
|---|---|---|---|---|---|
| Art Tefissial | ABA5011 | Machine 4 | Triteq Day Spa | 11/7/02 9:14:00 AM | |
| Art Tefissial | ABA5011 | Machine 7 | Triteq Towing | 11/7/02 9:14:00 AM | |
| Art Tefissial | ABA5011 | Machine 5 | Triteq Drugstor | 11/7/02 9:14:00 AM | |
| Art Tefissial | ABA5011 | Machine 3 | Triteq Motel | 11/7/02 9:14:00 AM | |
| Art Tefissial | ABA5011 | Machine 5 | Triteq Drugstor | 11/7/02 9:15:00 AM | |
| Art Tefissial | ABA5011 | Machine 1 | Triteq Gym | 11/7/02 9:15:00 AM | |
| Art Tefissial | ABA5011 | Machine 2 | Triteq Dairy | 11/7/02 9:15:00 AM | |

⦿ All Time Records
○ Last Week Records
○ Last Month Records
○ Time Range Records ☐ Click to enable Automatic Audit Printing

[Print Current Screen]

From: 11/7/02 9:52:56 AM
To: 11/7/02 9:52:56 AM

Sort by Access: [All ▼]
Sort by Driver: [Art Tefissial ▼]
Sort by Asset #: [All ▼]

Activity Abbreviations:
BA = Battery Removed
BR = Bad Route
L = Limited
U = Unauthorized

[Execute]  [Close]

— SORT/PRINT/FUNCTIONS —

FIG. 9B

Edit Key Limits — 136

| | |
|---|---|
| Name | Art Tefissial |
| Authorized By: | Administrator  (11/6/02  2:41:19 PM) |

Start: 8 ▼  ▼
Stop: 5 ▼  ▼
Total Accesses: 300
Accesses Per Day: 60
Refresh Days: 7

137 —  Disable FOB

FOB ID: ABA5011

Days valid
- ☐ Sunday
- ☑ Monday
- ☑ Tuesday
- ☑ Wednesday
- ☑ Thursday
- ☑ Friday
- ☐ Saturday Key Type: Full Serve - FS ▼
Route: 0

[CANCEL]  [View Present Limits]  [View Previous Limits]

[Accept]

⇩

Administrator Logged in:

File  AuditTrails  Edit Key Limits  Customer/Lock Info  Routes  Tools  Mode  Help Only for KEY FOBS starting with: AB

| | | | |
|---|---|---|---|
| Name | Art Tefissial | Key Type | Full Serve -FS |
| Key ID | ABA5011 | | |
| Total Accesses | 300 | Start Time | 8:00 am |
| Accesses Per Day | 60 | Stop Time | 5:00 pm |
| Refresh Days | 7 | | |
| Expires on | 11/14/02  12:00:00 AM | | |
| Days Valid | MTWTF | | |

At: ☐  Cradle Ready for Key FOB

REFRESHED FOR ABA5011
Art Tefissial

[EXIT]  [Audit Trails]  [Clear Form]

FIG. 16
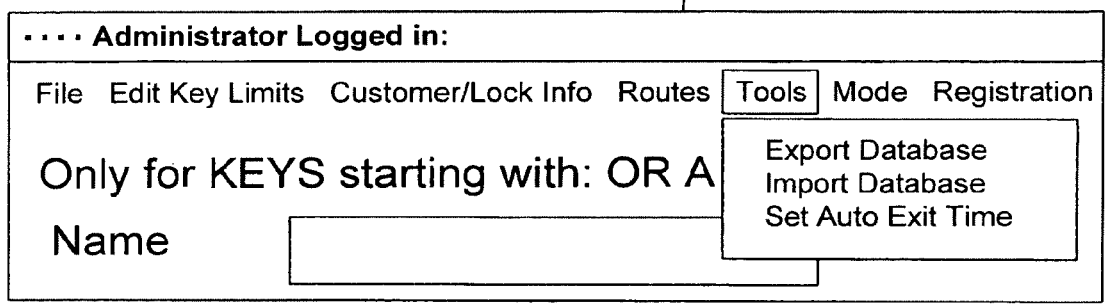
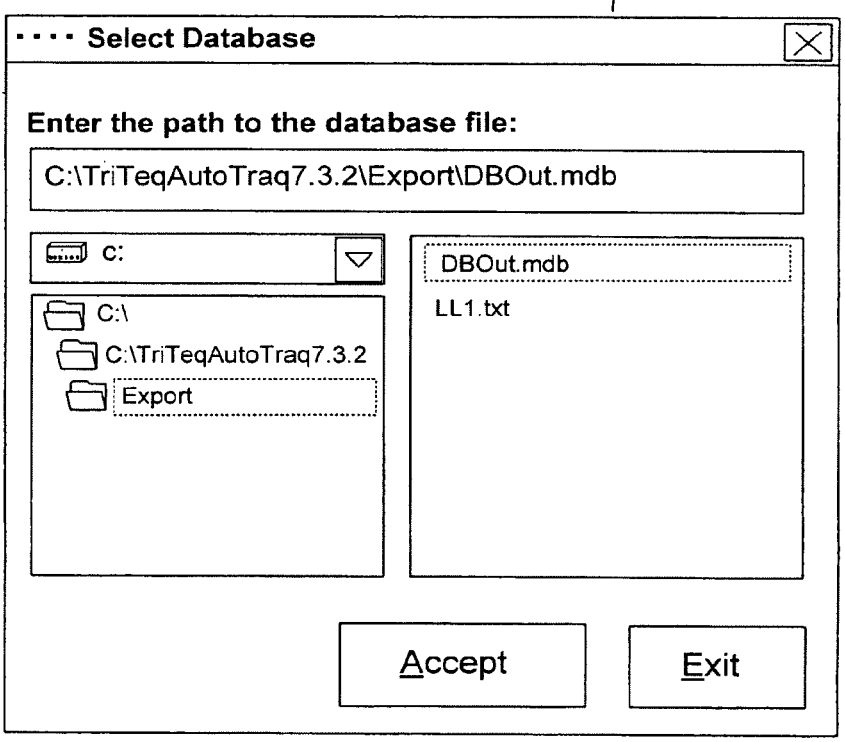

FIG. 18
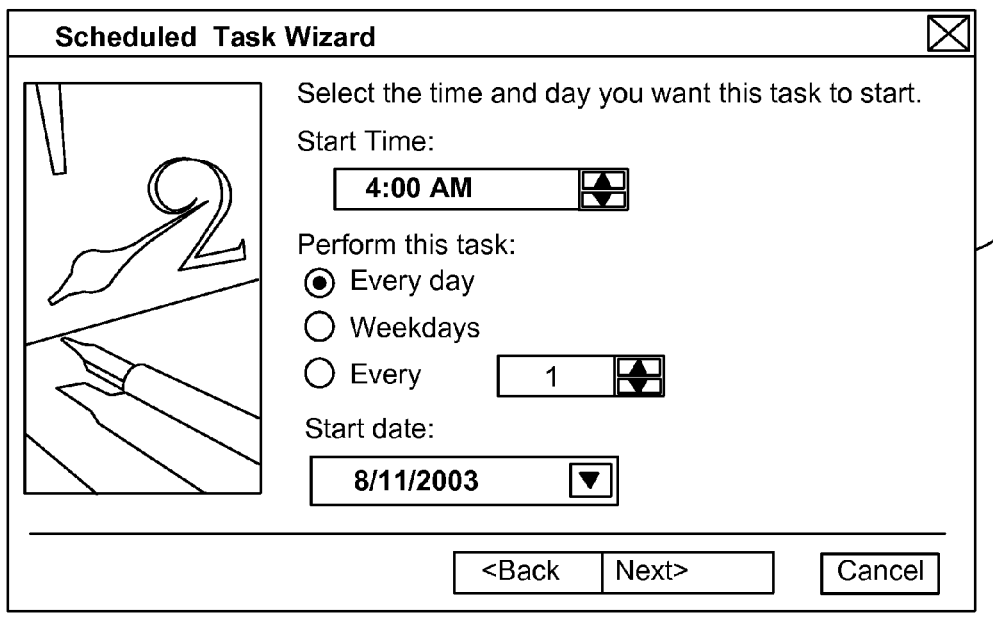
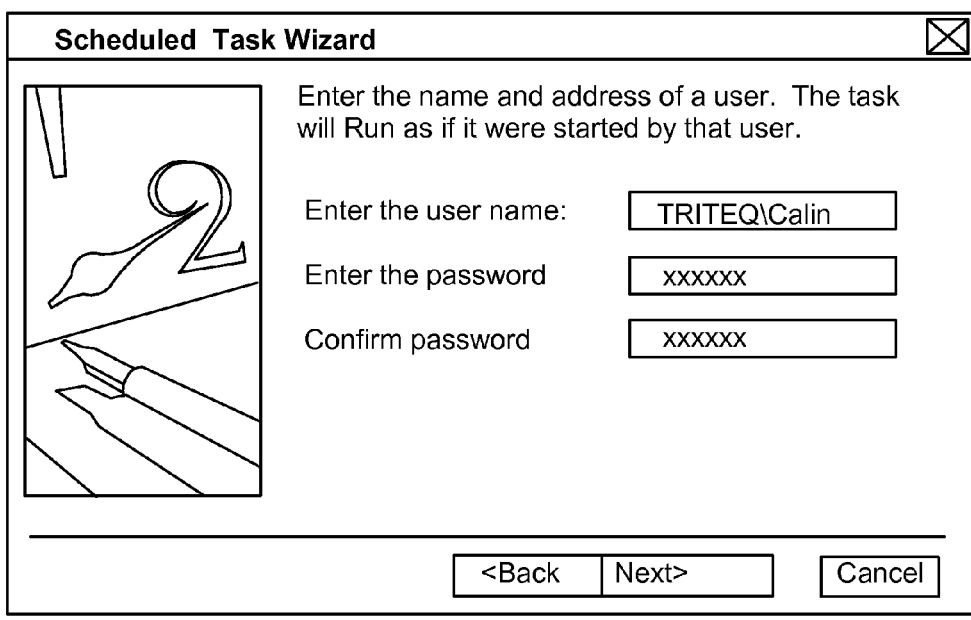

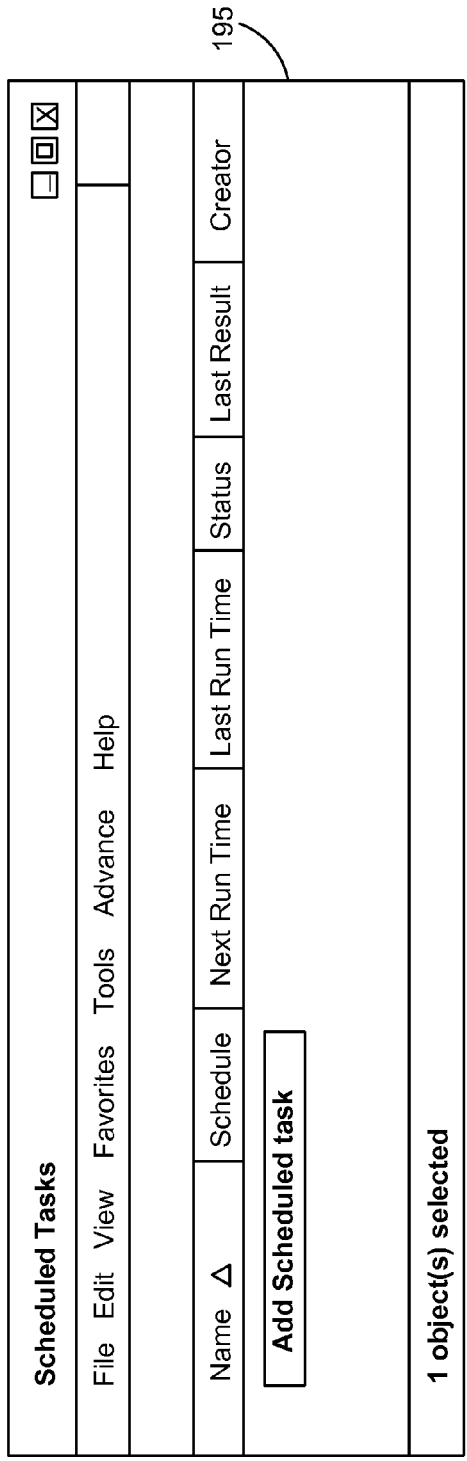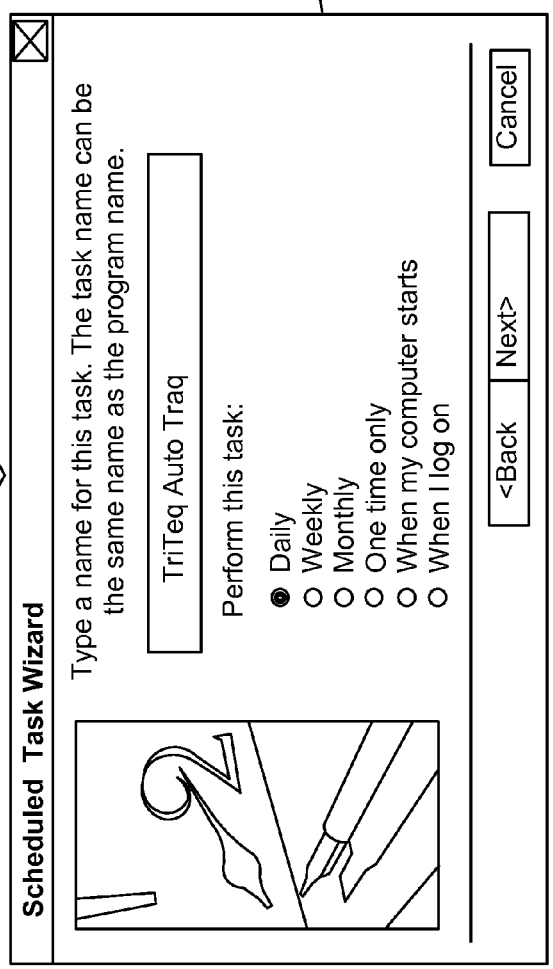
FIG. 19

FIG. 20
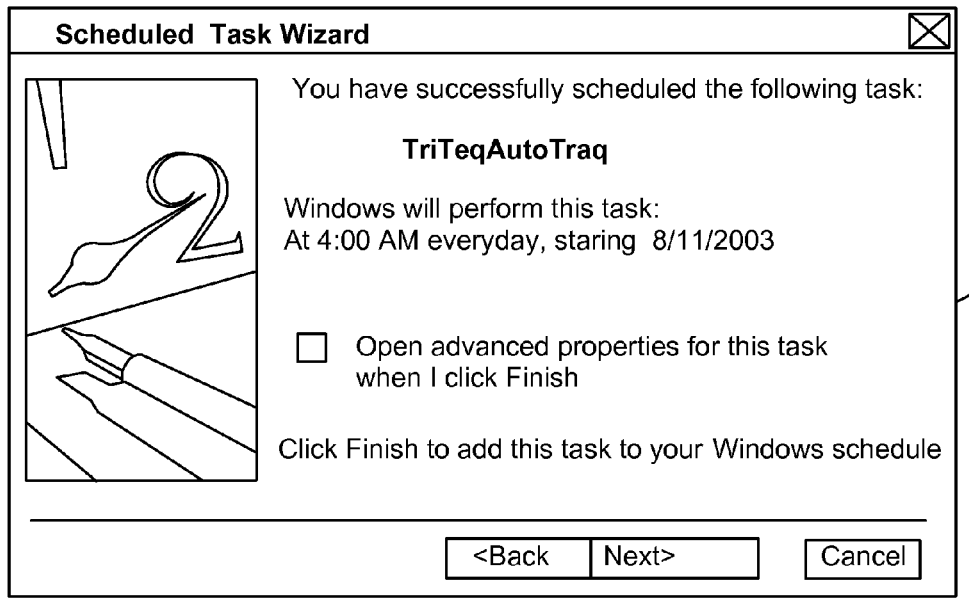
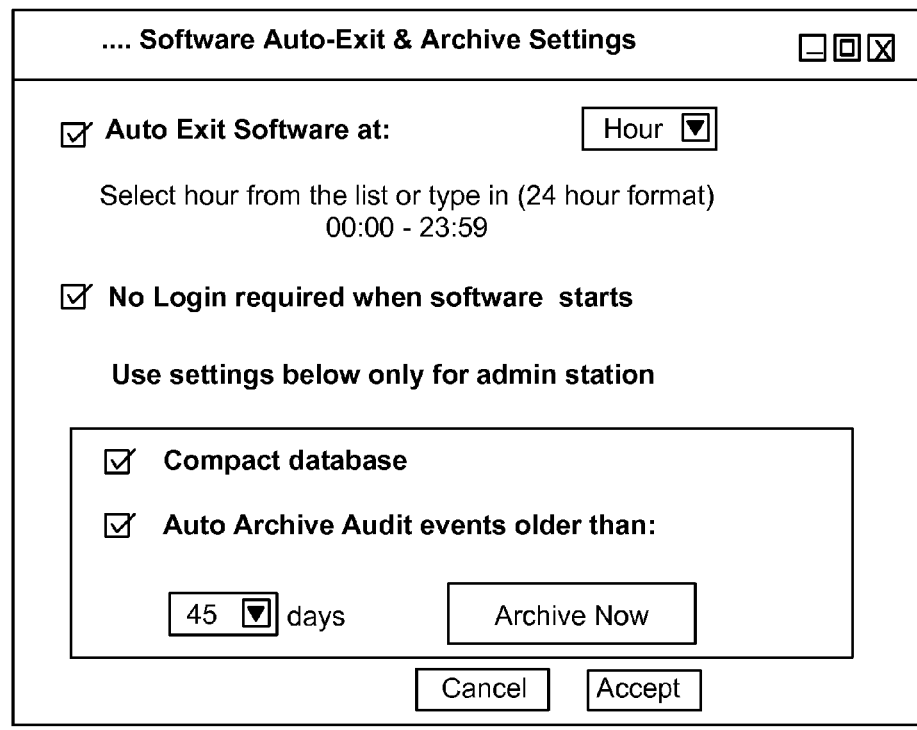

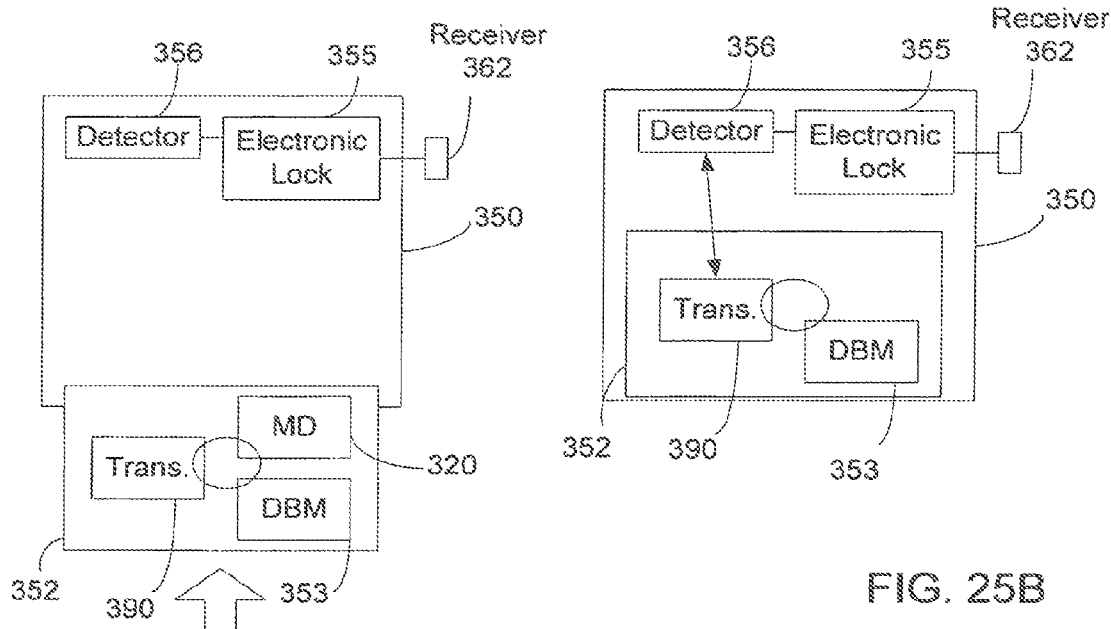
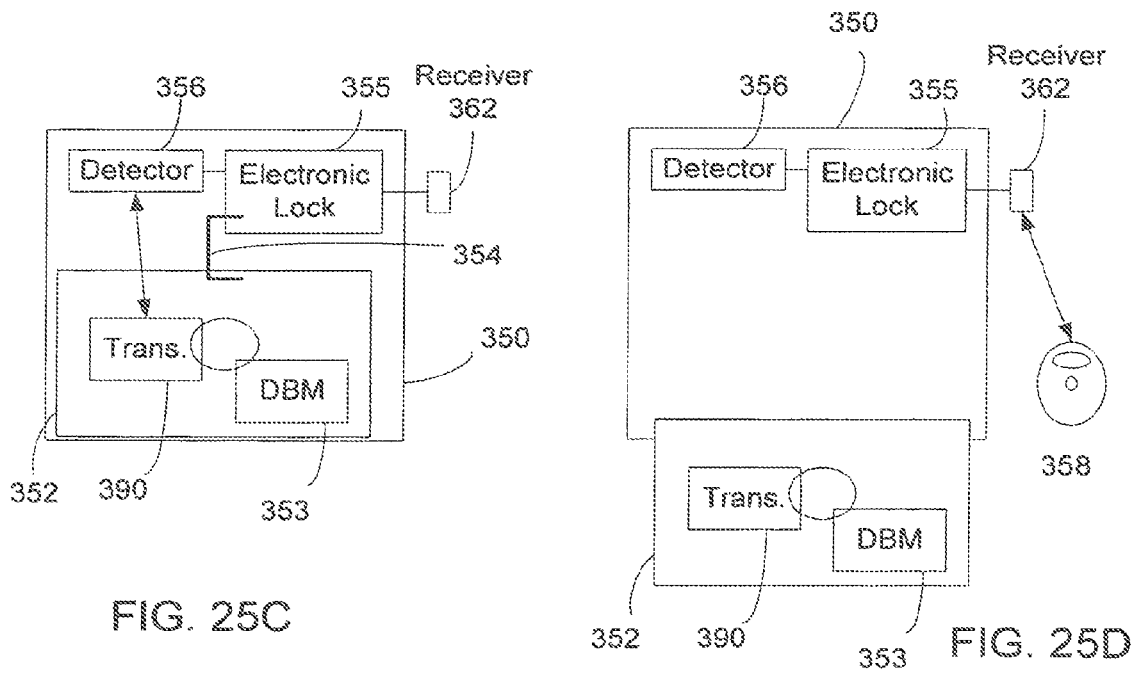

ELECTRONIC SECURITY SYSTEM FOR MONITORING MECHANICAL KEYS AND OTHER ITEMS

RELATED APPLICATIONS

This application is a divisional patent application of U.S. application Ser. No. 11/111,559 filed Apr. 21, 2005, which is a continuation-in-part of U.S. application Ser. No. 11/010,661 filed Dec. 13, 2004, which claims the priority of U.S. Provisional Application 60/528,831 filed Dec. 11, 2003.

FIELD OF THE INVENTION

The present invention relates to an electronic security system for monitoring the location of and controlling access to mechanical keys or other types of valuable items.

BACKGROUND OF THE INVENTION

Mechanical locks and keys have been used on vending machines for over the past 50 years. One particular problem with mechanical keys is the difficulty in keeping track of the whereabouts and usage to ensure that the mechanical keys are not used by unauthorized persons or by authorized persons but at unauthorized times or places. For instance, mechanical keys for vending machines are typically given to employees responsible for assigned vending machine routes. The employee for a given route has a schedule for visiting the vending machines on the route at particular times to collect money and restocking goods in the machines. It has been a common concern that the mechanical keys for the vending machines may be stolen and used by thieves to steal money and goods from the machines. Also, it is a concern that the keys may be used either by authorized or unauthorized persons at unauthorized times to access the vending machines. What is required is an electronic security system to overcome some of the management and security problems associated with the use of mechanical keys.

BRIEF SUMMARY OF THE OBJECTS OF THE INVENTION

In view of the foregoing, it is an object of the invention to monitor the location, position, and operation capability of access control devices, especially mechanical keys.

It is an object of the invention to provide a system to secure, enable/disable, and track the location and disposition of access control devices such mechanical keys, and other valuable items such as money, fire arms, tools, etc.

It is a related object of the invention to provide a record regarding the location and accessibility of an access control device or valuable item being monitored for auditing purposes.

These objects and other advantages of the invention will be apparent from the detailed description provided herein.

BRIEF DESCRIPTION OF THE DRAWINGS

FIG. 1 is a schematic representation of an embodiment of a key management system including a personal computer having a local database and software program, and cradle that functions as an interface for communications between an electronic key and the computer;

FIGS. 2A-2B are schematic diagrams showing the user interface screen and process for registering the software and the cradle of the key management system;

FIGS. 3A-3C are schematic diagrams describing a start-up and refresh sequence of the keys;

FIG. 4B is a flow chart showing a process for a user to enter electronic lock information;

FIG. 5B is a schematic diagram showing user interface screens for the operation of entering key user information;

FIG. 6A is a schematic diagram showing a process of collecting electronic lock ID information;

FIG. 6B is a schematic diagram showing user interface screens for prompting a user of the key management system to enter information regarding a new electronic lock;

FIG. 6C is a schematic diagram showing an alternative process for collecting electronic lock ID information;

FIG. 8 is a schematic diagram showing user interface screens for displaying audit trails data collected by electronic keys from vending machines;

FIGS. 9A-9B are schematic diagrams showing user interface screens for a process of editing key limit operational parameters;

FIG. 16 shows user interface screens for generating an export file for synchronizing distributed databases;

FIGS. 18-20 show user interface screens involved in scheduling the operation of the key management system for auto start up;

FIGS. 25A-25D are schematic diagrams of a security container in the form of a safe that is configured for securely storing valuable items such as mechanical keys;

DETAILED DESCRIPTION OF THE INVENTION

Figure 2B:
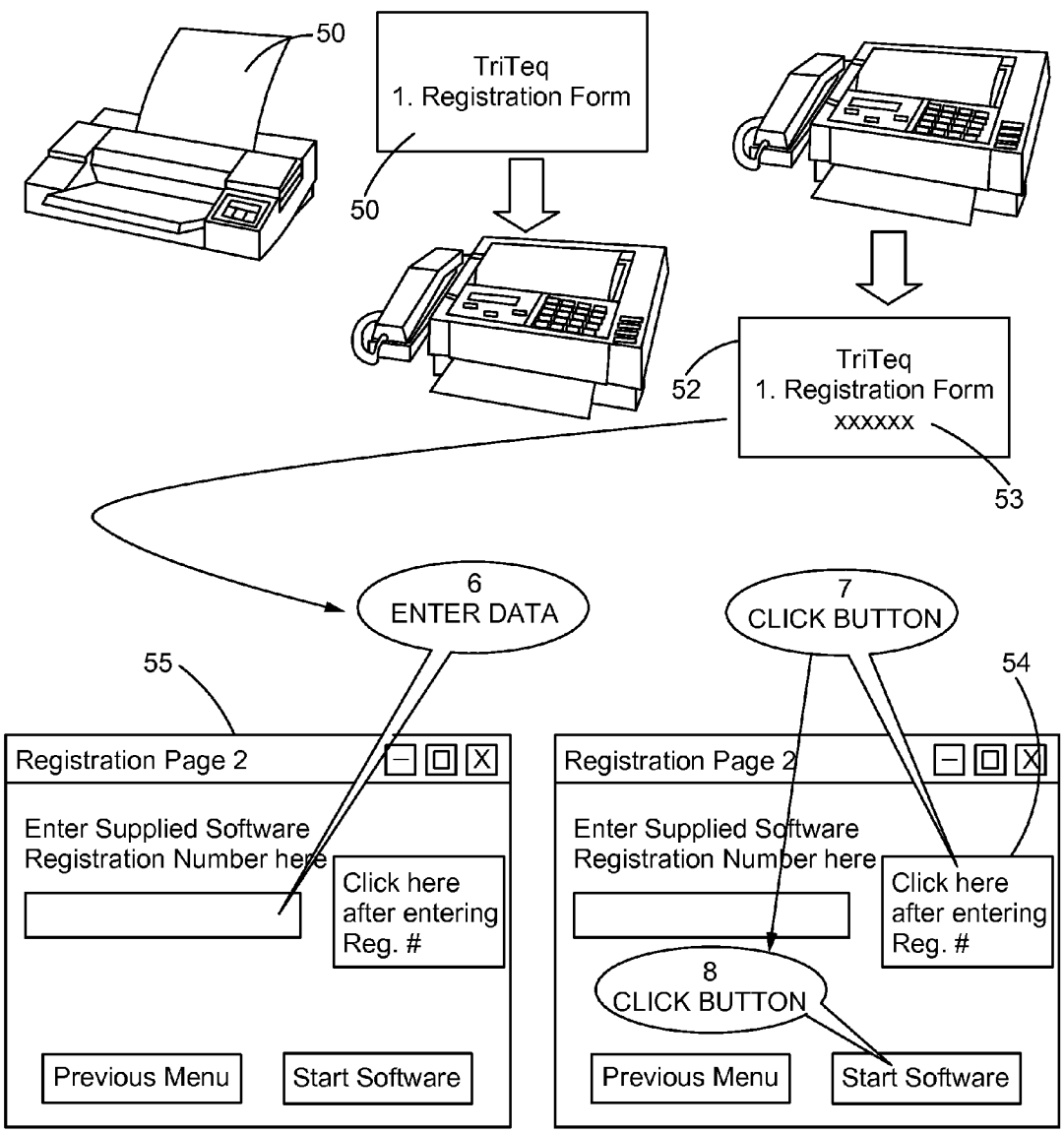

The present invention provides a system for monitoring the location of mechanical keys and/or other access control devices or valuable items, to prevent unauthorized access to the keys or valuable items. Prior to describing embodiments of the invention, a system for managing electronic keys used for accessing vending machines or the like and for managing audit data collected by the electronic keys from the vending machines is first described with reference to FIGS. 1-23. The technologies involved in the electronic keys and key management system may be advantageously used in implementing the system of the invention, which is described in detail with reference to FIGS. 24-30.

In an embodiment shown in FIG. 1, the electronic key management system (or station) 30 includes a computer 32 which may be a desktop personal computer (PC), with appropriate computer software and hardware for carrying out the functionality of key management and database operations. The software program 34 for key management and database operations may be a Visual Basic program executing on the PC. The computer 32 also includes a database for storing data for key management and audit data collected from vending machines. As used herein, "database" may include data files as well as a database program. In one implementation, the database 35 may be a Microsoft ACCESS database residing on the PC 32.

As illustrated in FIG. 1, the electronic key 31 includes a status indicating device which may be an LED light 38, and a push button 39 that when pressed causes the key to start wireless transmission. To communicate with the electronic key, the key management system 30 includes an interface device for forwarding and receiving communications to and from an electronic key. In the embodiment illustrated in FIG. 1, the interface device is in the form of a cradle 36 (or docking station) that interfaces the key to a communication port 33 on the PC 32. The cradle 36 has a receiving place for receiving the electronic key, and indicators such as a ready/wait light 40.

The database 35, software 34 and cradle 36 transceiver interface systems are limited for secure operation on only one particular computer 32 by means of registration. The software programs and the cradle can properly function only after they are registered with an authorized control center. Thus, a thief cannot install stolen components on a computer at an unauthorized location. The steps of an exemplary registration process are described with reference to FIGS. 2A and 2B. FIG. 2A shows an interface screen that presents a registration form 42 and a Software Registration Menu. After the software programs are installed on the computer 32, a user may click on a "registration" tab in the menu bar to bring up this registration form. To fill in the required data, the user looks at the bottom of the cradle 36 for the cradle serial number, and enters this number into the form 42. The user looks at the compact disc (CD) containing the key management software for the CD serial number, and enters it into the form. The user also fills in other required information, such as contact information including the bottler name, contract name, address, phone number, etc., into the registration form. Once the registration form 42 is properly filled, the user clicks on the "Generate System ID#" button 44. After this button is pushed, the software program generates a system ID number for this system based on the serial numbers and/or other information entered by the user. The system ID number appears at the bottom of the form 42 under the "Get Registration #) button 45. The user then clicks on the "Get Registration #" button. In response, the software program generates a registration form containing the user-entered information and the system ID number, and sends the form to the printer for printing, as illustrated in FIG. 2B. This registration form 50 is then sent, for example via facsimile, to the control center (e.g., TriTeq Corporation) so that the control center can register the key management system using the system ID number. The control center then issues a special code 53 as a registration number for the user's system. The special code is generated based on the system ID number and possibly other information provided by the registration form 50. This registration number 53 may be sent to the user in a registration response form 52 that may be transmitted via facsimile to the user. The registration number may also be sent via other means of communication, such as email, mail, or voice communication (e.g., a phone call). The user then goes to the next screen 55 of the user interface for software registration, and enters the received code 53 into a provided field. After the user clicks an Enter button 54, the software stores the entered registration number in a special memory location.

The registration process described above links together the serial numbers assigned to and/or embedded in the software 34, the interface cradle station 36, and the computer 32 to create an authorization number stored in the database 35. Each time the software 34 is restarted, it reads the serial numbers of each of the components to calculate the authorization number, and then compares this number to the authorization number in the database to make sure they match before operating. If the calculated authorization number does not match the stored authorization number, the software does not allow the user to access the system management functions, and the system is inoperative.

Figure 3B:
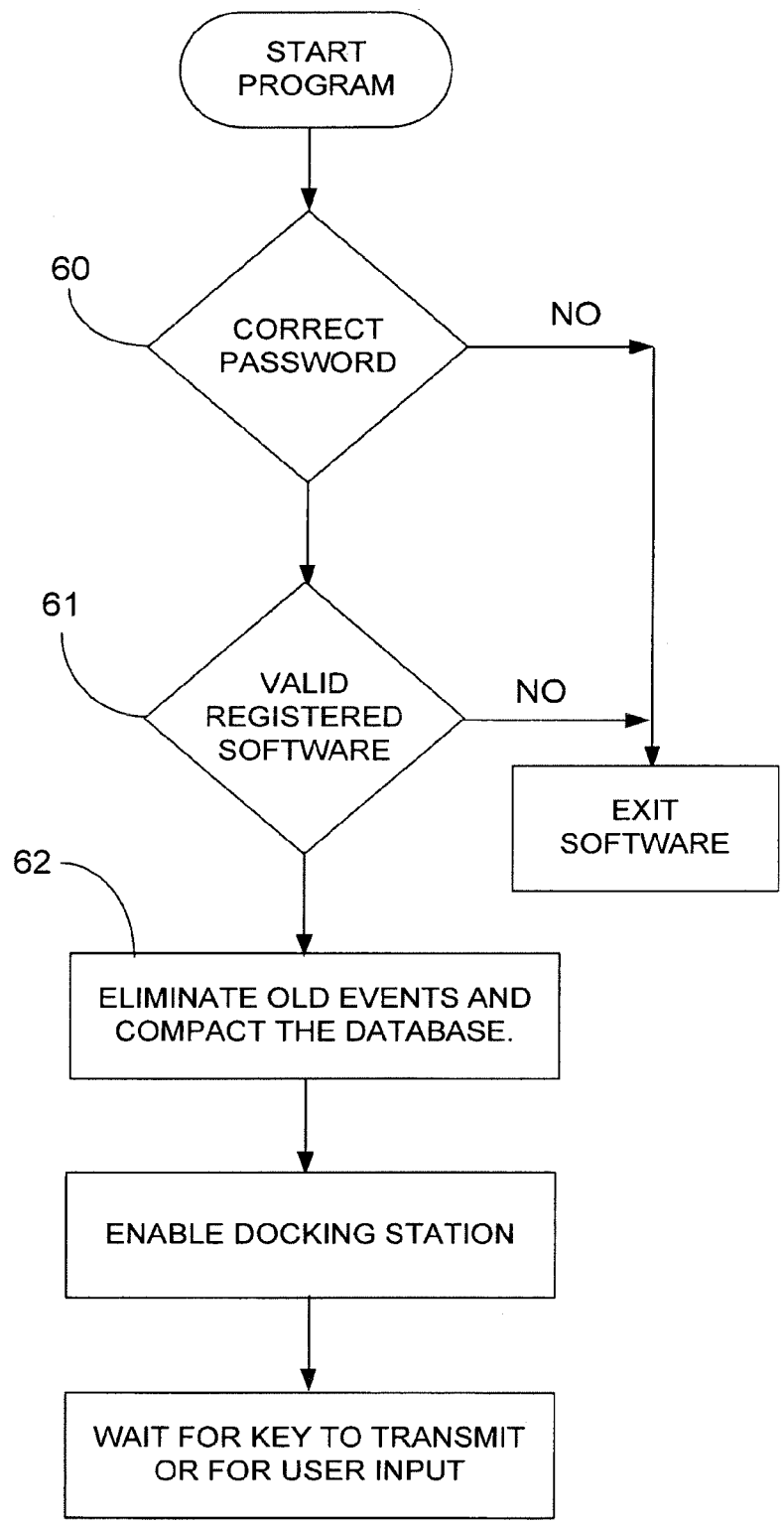

FIGS. 3A & 3B describe how the database interaction with the docking station or cradle is initiated by starting the software system which allows database accesses and data transfer to/from the database. One password is optionally required to initiate the "User" operation mode. As shown in FIG. 3A, after the software is started, the software presents a window 58 on the computer screen for the entering of a password. The software then presents a key control window 60 that contains various control parameters or limits for controlling the operations of the electronic key. For instance, the key control screen in FIG. 3A includes fields for the name of the user of the key, the ID number for the electronic key, the key type, the total number of accesses allowed, the allowed number of accesses per day, the start and end times of the operative period of the day, the expiration day and time, and the number of days in which the key is valid, etc.

Referring to FIG. 3B, when the software program 34 is started, the software presents the password window as shown in FIG. 3A and waits to receive a user mode password. When a password is received, the program determines whether the password is correct (step 60). If the user password is incorrect, the software program exits from operation. If the user password is correct, the program determines whether the system is properly registered in the way described above. If the system is registered, the program works on the database 34 by eliminating old events and compacting the database (step 62). The program then turns on the cradle 36, and waits for transmissions from an electronic key docked in the cradle.

Turning now to FIG. 3C, to initiate a docking or refresh operation of the key 31, the key is placed within communication distance of the cradle 36. As shown in FIG. 1, the cradle 36 may have a receiving location on its top into which the key may be placed. The user then presses the transmit button 39 of the key 31 to cause the key to start transmission. The transmission from the key is received by the cradle 36 and forwarded to the computer 32. Likewise, communications from the computer 32 are sent to the cradle 36, which then transmits the communications to the key 31. FIG. 3C illustrates that first the key 31 and cradle 36 exchange encryption messages to ensure that an authorized key is communicating with the station. To that end, the cradle 36 includes a microprocessor for providing the processing power and has software programs including an encryption program for handling the encryption/decryption involved in the challenge-response communications and any subsequent communications. Next, if the key contains access audit data collected from vending machines in the field, the data is downloaded from the key and stored in a buffer 64. The data in the buffer 64 may then be sorted and loaded into the database 35. The new operation limits (see FIG. 3A) pre-set by a supervisor for that electronic key are then downloaded into the key 31.

In accordance with a feature of the embodiment, the operation of refreshing the key and downloading data from the key is automatic, without requiring a user to oversee or activate each of the steps involved in the process. All the user has to do to initiate the key refreshing operation is to place the key 31 in the cradle 36 and press the transmit button 39 of the key, and the software program 34 will finish the operation without requiring further attention from the user or system administrator. During this process the database 35 proceeds to service the key without prompting the user to enter any information or data at the computer either before or after the key is initiated. As a result, the key refreshing operation may run in the background, without the need to have an open window on the computer screen, thereby allowing the computer 32 to be used for other operations such as word processing or communications over the Internet. To service the next key, the previous key is removed, the new key is inserted and its transmit button is pressed. Again, the database proceeds to service the key without prompting the user to enter any information or data at the computer either before or after the key is initiated. The docking or refresh operation can be performed without the supervisors present, which allows the system to perform without daily maintenance.

Figure 4A:
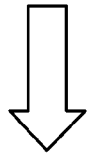
FIG. 4A is a schematic diagram showing user interface screens for a user to entering supervisor and administrator modes.

FIGS. 4A & 4B illustrates an advanced set-up feature of an embodiment of the key management system that is only accessible by entering a secure operating mode, which may be either the "Supervisor" or "Administrator" modes. As shown in FIG. 4A, the software first presents a key control window 70 similar to that in FIG. 3A. By clicking on the Mode option in the Menu bar, a user can select to run the software in a Supervisor mode or a User mode. Selecting the Supervisor mode causes the software to open a password entry window for either the administrator or supervisor. The user then enters the password as an administrator or supervisor into the field provided. In one implementation, an administrator oversees multiple supervisors, while each supervisor supervises multiple users to which electronic keys are assigned. When a user signs in as the administrator, he can use the software to add or remove supervisors from the key management system as well as administrating the functions of the key management system. A supervisor can use the software to add or remove electronic keys and/or key users, and set or change key limit parameters.

As shown in FIG. 4B, when audit data is downloaded from an electronic key, the software program determines whether it is in the administrator mode or supervisor mode (step 80). If neither, the program finishes the key refreshing operation by loading new key parameters into the key. If the program is in the administrator or supervisor mode, the program checks the audit data received from the key to see whether the data contains identifications of any vending machine electronic lock that is not found in the database (step 81). In this regard, the audit data stored in an electronic key are collected from electronic locks in vending machines accessed using the electronic key. The audit data collected from an electronic lock contains, among other things, a serial number of the electronic lock. It is possible for the electronic lock of a vending machine to be programmed in the field to work with a given key before the ID number of the lock is registered in the database of the key management system. If the key management program finds a new lock serial number in the audit data downloaded from an electronic key, it prompts the user to enter the lock information into the database (step 82). If the user selects not to do so at that time, the program continues the key refreshing operation. If the user selects to enter the lock information, the program present a user interface window (step 83) to allow the user to enter information about the electronic lock (step 84). The program then continues to finish the key refreshing operation.

The electronic keys contain certain key codes for access authorization purposes. It is desirable to limit which keys can be serviced by which computers such that stolen or lost keys cannot be serviced at computers they are not authorized to be serviced at. Thus, the database preferably contains a feature to limit which serial number sequence keys it will service and which it will not service. If a key is not in this serial number range, the database, computer, and software will refuse to service it. The limit parameters are usually entered into the database by a supervisor just after installing the software.

Key Set-Up

Figure 5A:
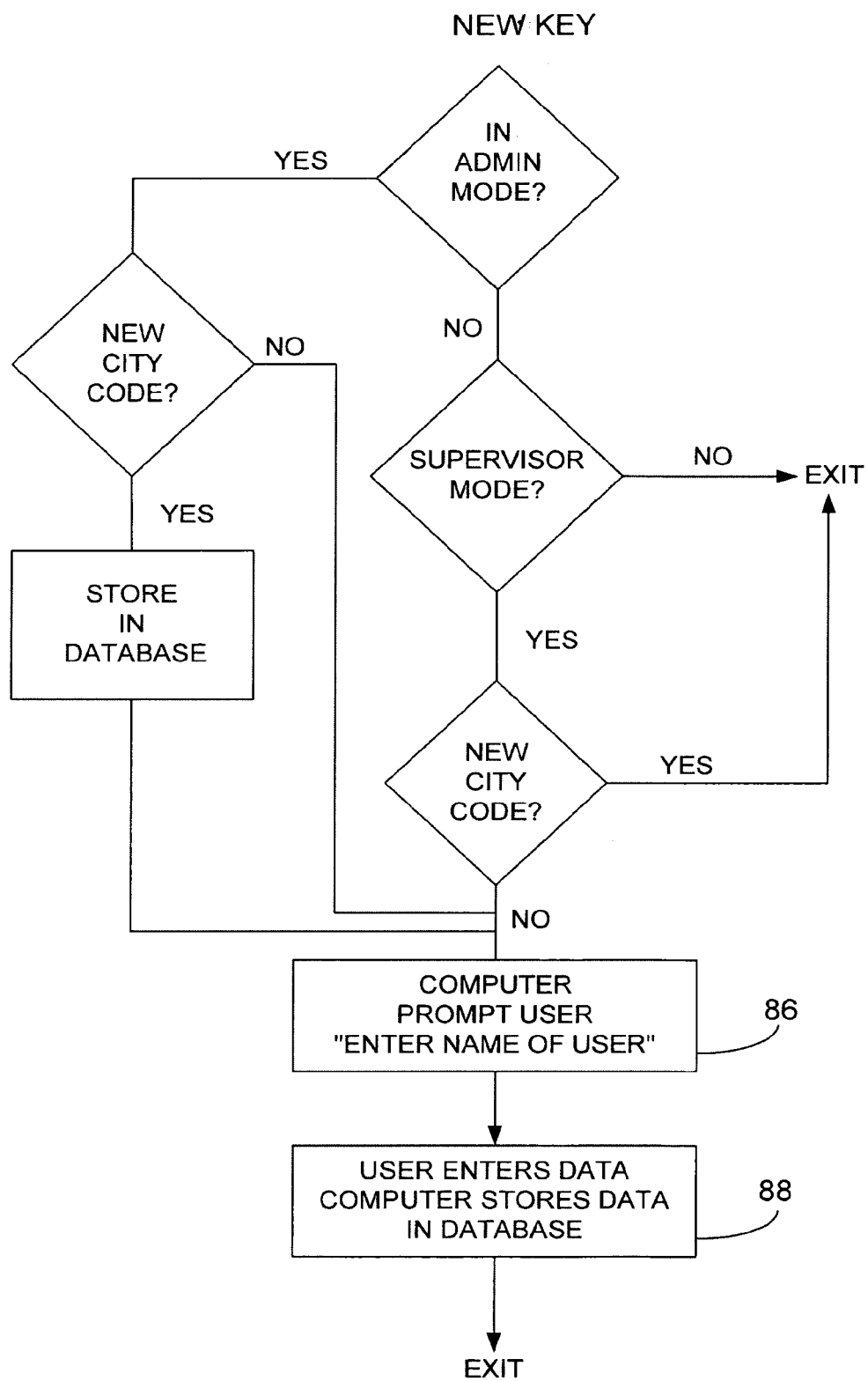
FIG. 5A is a flow chart for a process of starting up or logging in new keys.

Certain set-up procedures are implemented in the system in order to make the security features of the system useful and easy to use. FIGS. 5A & 5B illustrate these features. First, the electronic keys need to be assigned to the employees. This is accomplished by a simple operation, as shown in FIGS. 5A and 5B. First, a new key never previously initialized (or not contained in the database) is placed within communication distance of the cradle station interface and the transmit button of the key is pressed. Next, the supervisor is prompted to enter the name or identifier of the user to which the key is to be assigned (step 86). The supervisor enters the required data, and the data is stored in the database (step 88). If it is for a new key user, the process is described in FIG. 5B. The software recognizes automatically that a new key is introduced into the system. In one implementation, the key indicator light stays "ON" and the cradle light stays "RED" when it is communicating with the key. Afterward, the program provides the user interface screen 90 shown in FIG. 5B to prompt the supervisor or administrator to assign the key to either a new user or an existing user. If the supervisor presses the "Assign New User" button 93, the screen 96 appears for the supervisor to enter information regarding the new user who is going to use the key. After entering the information, the supervisor clicks on the "Accept" button, and the new user information is stored in the database 35. Next, the transmit button 39 of the key is pressed again, and the program presents the key control window to allow the supervisor to set the limits for the key operation. When the user enters this name, the database links the serial number embedded in the non-volatile memory of key with the name for reference purposes. Also, a set of default limits are assigned to the key in the database, such as 200 total accesses, 20 access per day, 6 AM to 6 PM operation, 7 days of operation, Monday through Friday operation. FIG. 5A also illustrates how only the supervisory or administrator sets the database up to allow the territory code to communicate to the database.

In managing the keys in an on-going basis, the supervisor may use the system to check the limit parameter status of the keys to quickly see which keys are either expired or approaching the end of their operation limit parameters. This is accomplished for example by selecting the "Edit Key Limit" menu on the main screen of FIG. 4A. In response, the program displays a list of the registered electronic keys and for each key the expected time and date the key will exceed its limits in a row and column format for viewing by the user.

Next, the electronic locks to be accessed with the keys need to be assigned to Customers, locations, and/or asset identifier numbers (identification data). FIGS. 6A-6C illustrate two methods. This procedure is necessary because the lock is initially identified by the database using a lock serial number embedded inside the lock non-volatile memory that is not easy or obvious for the user of the system to reference or identify to. Once each lock is referenced to a number or name that the user can more easily identify with, understanding and using the audit trail data will be more likely. There are several possible procedures for entering the lock information. Each procedure is possible even if the lock is remotely located from the computer and either cannot or does not directly transfer its serial number to the computer and database.

In one procedure shown in FIG. 6A, the lock serial number 90 is printed on a label 91 attached to the lock as an alphanumeric number or as a barcode or other identifier. This number can be visually read and recorded in a form 93 along with the customer, location, and/or asset identifier number for the lock, and then manually entered into the database 35. The disadvantage of this system is if the serial number label is lost or not legible, it would be difficult to identify the electronic lock.

In another procedure also shown in 6A, the lock serial number 90 is not printed on a label, but is read from the lock by a diagnostic tool 92 to make certain the correct serial number is recorded. This number can be visually read from the tool display, recorded along with the customer, location, and/or asset identifier number, and manually entered into the database. In this procedure, a lost label on the lock will not impede the process.

FIG. 6B describes the manual entry process of entering the collected lock, vending machine, and location information and entering it into the database. In the shown example, a key assigned to a user "Gary Myers" has visited a new vending machine that are not registered in the database 35. The electronic lock information is time-stamped into the key when the key is used to access the lock. When the key user returns to the key management system 30 and places the electronic key into the cradle 36 for key refreshing operation, the lock information is downloaded from the key to the computer. The program notices that the downloaded key data contains new lock information not already entered into the database. For each new electronic lock identified in the key data, the program presents a "New Lock Detected" window 100 on the computer screen showing the lock serial number and the time at which the lock was accessed. When the user clicks the "Enter Lock Information" button, the program presents a "New Lock Data" screen window 102 to allow the user to enter detailed information about the vending machine containing that electronic lock, such as the vending machine asset number, customer number, route number, date in service, and location address, etc. After entering the information, the user clicks the "Update Lock Information" button, and the information is stored into the database. The program than presents another "New Lock Data" screen for the next new lock identified in the downloaded key data.

In another procedure shown in FIG. 6C, the user has an electronic tool 94 that electronically reads or scans the serial number 90 from the electronic lock (either by communicating with the lock or reading the printed label) and electronically reads or scans an identifier label 95 on the vending machine 96. This electronic reader or scanning device links the two identifier numbers together in memory. This procedure can be repeated for many vending machines for as long as the reader does not run out of memory. After the scan/read process is completed, the reader 94 can download its data into a computer that can ultimately transfer this data to the database. In this procedure, the lock and vending machine data is electronically linked, so the manual data entry procedure can be avoided.

Lock-Database Data Exchange

Data may be exchanged to/from electronic locks of vending machines and the key management database 35. One method involves using an electronic key to collect the audit information in the lock and ultimately transfer this data to the database 35. In alternative embodiments, wireless communications may be used for the data transfer. For example, the lock can communicate directly (or indirectly) through a wireless medium to a computer transceiver interface to transfer the data to/from the database. The preferred embodiment described below uses the electronic keys to transfer the access limits and the audit trail information, but this invention is not limited to this method.

Figure 11:
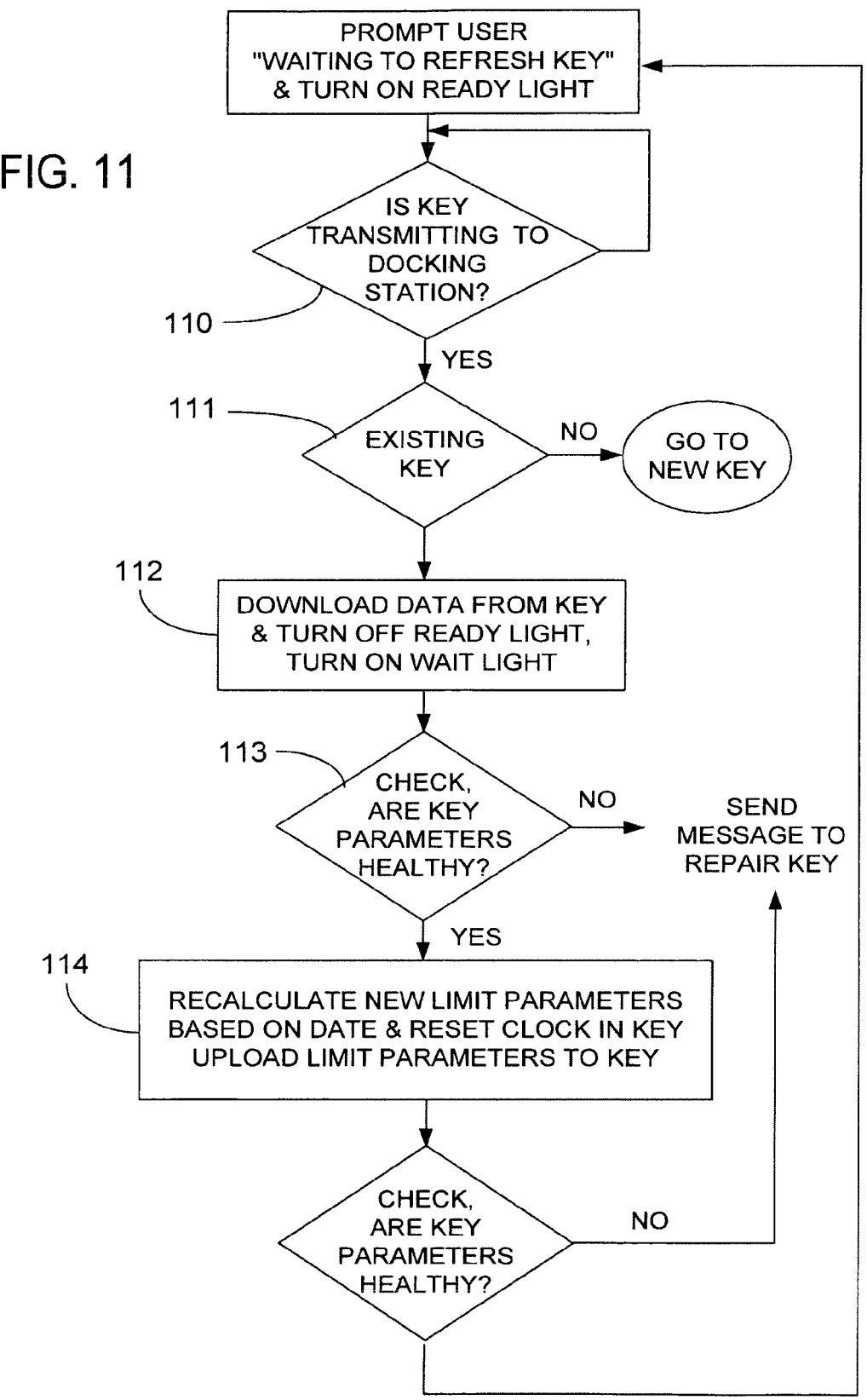
FIG. 11 is a flow chart showing a process of refreshing the memory of an electronic key.

During service of the key 31, data is exchanged from the key to the computer 32 and from the computer to the key as described in FIG. 11. Before this exchange takes place, the cradle 36 is in the receive mode, wherein any transmission signal from the key will initiate the data exchange process. The timing and sequence of the data exchange is automatic, and it is only necessary to initiate one start operation at the key to exchange the data in both directions. The communication between the key and the cradle is preferably protected by bi-directional encryption methods. During the process, the program determines whether the key is transmitting to the cradle (step 110). If the key transmission is received, the program determines whether the key is an existing key or new key (step 111). If the key is an existing key, the data stored in the key is downloaded from the key (step 112). The program then checks whether the key parameters are healthy (step 113). If so, the program retrieves or recalculate new limit parameters for the key, reset the clock in the key, and upload the limit parameters into the key (step 114). The computer will proceed to service the key provided it is authorized to do so. Such authorization may be provided in the database locally stored on the computer hard drive. One can have such authorization at multiple computers if the authority is granted.

In the event of multiple computers authorized to service the same keys, rather than having multiple computers with multiple databases local to the respective computers, it may be more convenient to have one database residing on a central server or shared drive so more than one computer and cradle can be used to service the keys. Thus, the authority to service the key resides in one database and all of the data exchanged is managed in one database rather than multiple databases. In that case, the data exchanged from the key to the computer may be immediately transported to the database or stored locally at the computer and later processed by the computer and loaded in the remotely located database. This may be a more desirable process since the data transfer may be very time consuming during heavy traffic hours on the network and may better and more reliably be transferred during low traffic times.

During this data exchange process, the health of the electronic key can be diagnosed. For example, the clock in the electronic key is read by the computer and compared to the clock in the computer. If there is a mismatch in time, the computer can alert the supervisor that the key can a faulty clock or battery. Likewise with the memory in the key. If the data exchange process is not successful, the battery or the memory may be suspect to be faulty, and the computer will display this fault for the user or the supervisor so the battery can be replaced or the key taken out of service.

Audit Data

During service of the key, the vending machine audit data collected by the key is downloaded from the key to the cradle 36, next to the computer memory buffer 64, and last to the database 35 of the computer. The data is managed by the supervisor by allowing each lock serial number to be identified in the database by the customer, location, and/or asset identifier number as previously described is set-up. The software may allow several options for managing this data in the database. This process is executed only one time for identifying the asset number, and one time for each time the vending machine is assigned to a customer or a location. The processes for identifying this data are as follows:

Pop-Up Request Process

FIG. 6B illustrates this process. In this process, the software will run a test while in the supervisor mode that will search the lock serial number in the data base. If no such number is identified, the software will prompt the supervisor to enter the data. The software will provide as much information about the vending machine as possible to help for the identification, such as the time and data the lock was first put into service or accessed.

Manual Process

The software will provide a menu to select the identification process. Next, a drop down list will list in numerical order all lock serial numbers that are not identified. Next, the user will select the lock that he/she wishes to identify. After selected, a screen is provided to enter the data. Also provided is a field for entering the effective data in case the identification data is entered several days or weeks after the data the data is valid.

This process can also be executed when viewing audit events from the database. In this situation, the lock serial number is displayed to identify the vending machine (in lieu of the vending machine asset number, customer, and location data). By selecting this number from this display position and clicking, the screen to enter the vending machine data will pop-up for ease of data entry.

FIG. 6B also illustrates that this process is also used after a lock is identified but the user wishes to change or modify some of the data, such as changing the customer information or location if a vending machine is moved or relocated. In this situation, the effective date field is used to properly record the exact date the change took place in case the data entry follows the change by a delay period.

Automatic process. It is possible for the identification data to be transferred automatically into the lock database. This identification data will be entered separately from another computer and/or database which separately contains the vending machine identification data.

Figure 7:
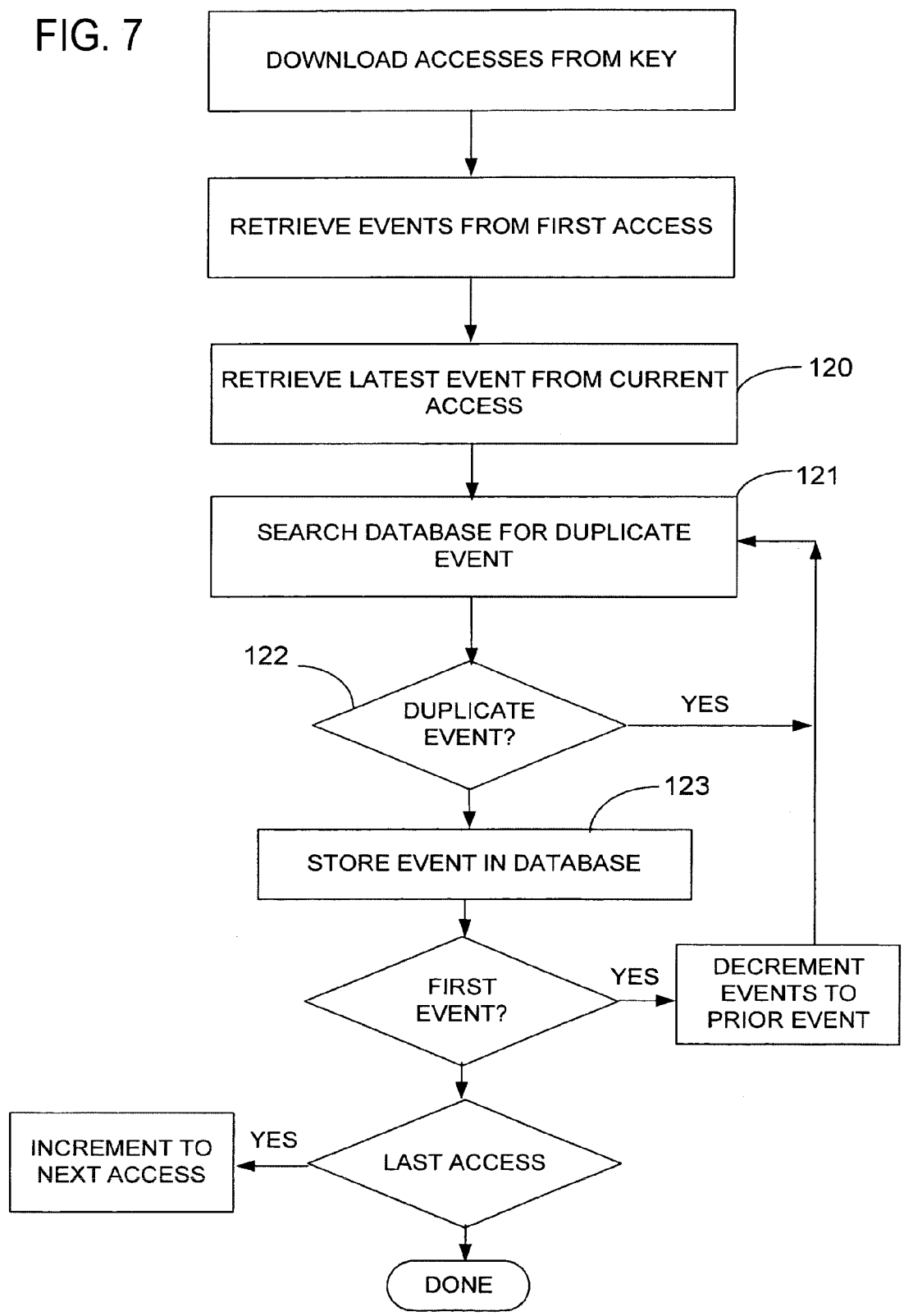
FIG. 7 is a flow chart describing a process of receiving and storing audit data.

Referring now to FIG. 7, as audit data is received from the key it is compared to previous data in the database. Since one or more key may bring duplicate access audit data back to the same database, it is necessary to compare the new data received from the keys with the data presently in the database and discard the like data so duplicate access data is not stored. To that end, when the program receives data downloaded from the key regarding an access attempt event (step 120), it searches the database for any event that is duplicate to the downloaded event (step 121). If a duplicate event is found in the database (step 122), the downloaded event is discarded. Otherwise, the event is stored into the database (step 123), and the program moves to the next event described in the downloaded data.

If access data is determined to be new, it is stored in the database 35. Suitable data sorting techniques are preferably used in order to efficiently store this data, and to efficiently retrieve this data in the future, and in the future compare this data to new data collected. The software shall be configured such that the audit information in the database cannot be modified or deleted, either accidentally or on purpose, in order to preserve the integrity of the security monitoring system. After audit data is stored in the database, certain data sorting techniques are required to make the viewing of the data useful.

For example, FIG. 8 illustrates it is possible to sort and view the data by Access, by Driver or Employee, by Asset number, or between certain time and date periods. Each of these sort parameters can be combined to sort multiple combinations of parameters. Also, as the audit information is displayed, unusual activity that occurred before or during the access event can be displayed, such as Battery Removed (from key), Bad Route, Limited, and Unauthorized. To view the audit trails data, the user either clicks the "Audio Trails" button at the bottom of the Key Control Data screen 126 or use the task bar menu. This function is only available to supervisors and administrators. The program then displays the audit trails screen 128. The bottom portion of the screen 128 presents sorting options that allow the data to be sorted in various ways, such as by time, access, key user, or asset number, etc. Different combinations of these options may be used to refine a search.

The audit trails data may also be printed. In one implementation, the printing options available are "Automatic Audit Printing" and "Print Current Screen." Automatic printing allows for printing when a key refresh is executed and prints all the new events the key has encountered. The audit screen does not have to be displayed on the computer screen to enable printing.

Limiting Operational Parameters for Keys

Limiting operational parameters are available for keys. To ensure the security of the system, in a preferred embodiment such new limits can be assigned only when the computer is in the Supervisor or Administrator modes. FIGS. 9A-9C and FIG. 10 illustrate the process.

Figure 9A:
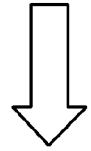
Figure 9C:
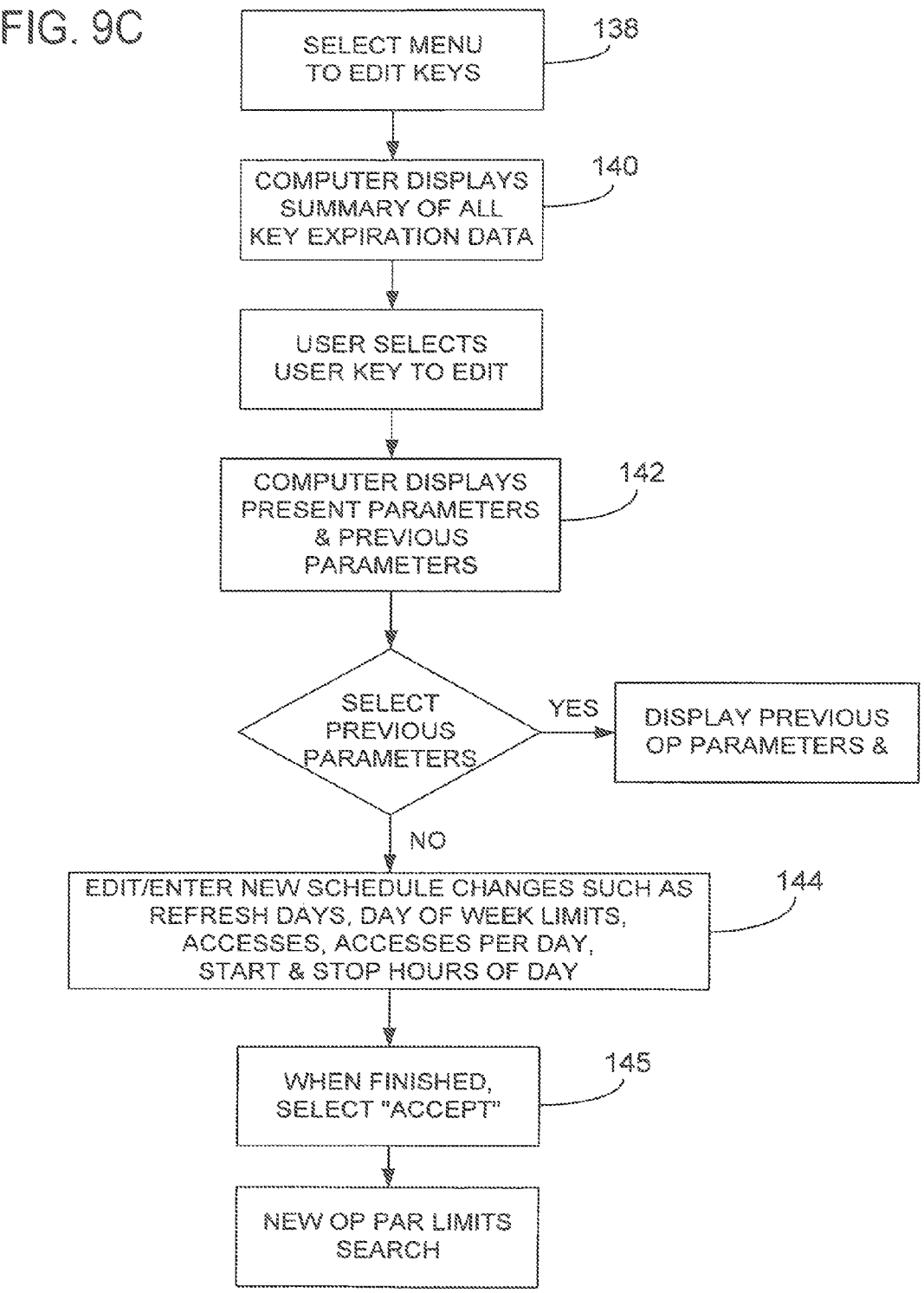
FIG. 9C is a flow chart showing a process of editing key limit parameters.

In FIG. 9A, if the supervisor wishes to assign a custom (non-default) set of parameters to this key, he selects the "Edit Key Limits" option in the menu bar of the screen 130 and then selects the "Set User/Key Limit" option from the drop-down menu (step 138 of FIG. 9C). In response, the system program presents a drop-down list 132 of keys (by names assigned to the keys) which also displays the expiration dates of the keys (step 140 of FIG. 9C). Next, as shown in 9B, the parameter customization screen 136 is displayed by selecting the user or key. This screen shows the key parameters since the last key refresh operation. For security reasons, the software tracks which supervisor last authorized limit changes. By clicking on the two buttons "View Present Limits" and "View Previous Limits," the user can see when the last changes were made on the key and by which supervisor (step 142 of FIG. 9C). On this screen, the pointer will move the curser to the parameter the user wishes to change. The user then enters the desired value (step 144 of FIG. 9C). After typing in the change, another parameter may be selected and changed. When all parameters have been changed, the "Accept" button is selected to record the new parameters in the database (step 146 of FIG. 9C). At the time these are stored, the name of the supervisor operating the computer is also stored to archive the authorization in case a key is given limits beyond their approved level and an audit of who assigned these unauthorized limits is required.

A "Disable FOB" button 137 is provided in the screen 136 to disable the key at its next refresh. In this regard, if the key reaches any of the limits, it will become disabled. The key will indicate that it is disabled by flashing brightly three times when the key is in the cradle and the transmit button of the key is pressed.

After the new parameters have been stored, prior parameters for this key are also kept in the database for easy viewing. In addition, the time and date of the prior docking event and the parameters can be stored and easily viewed.

Figure 10:
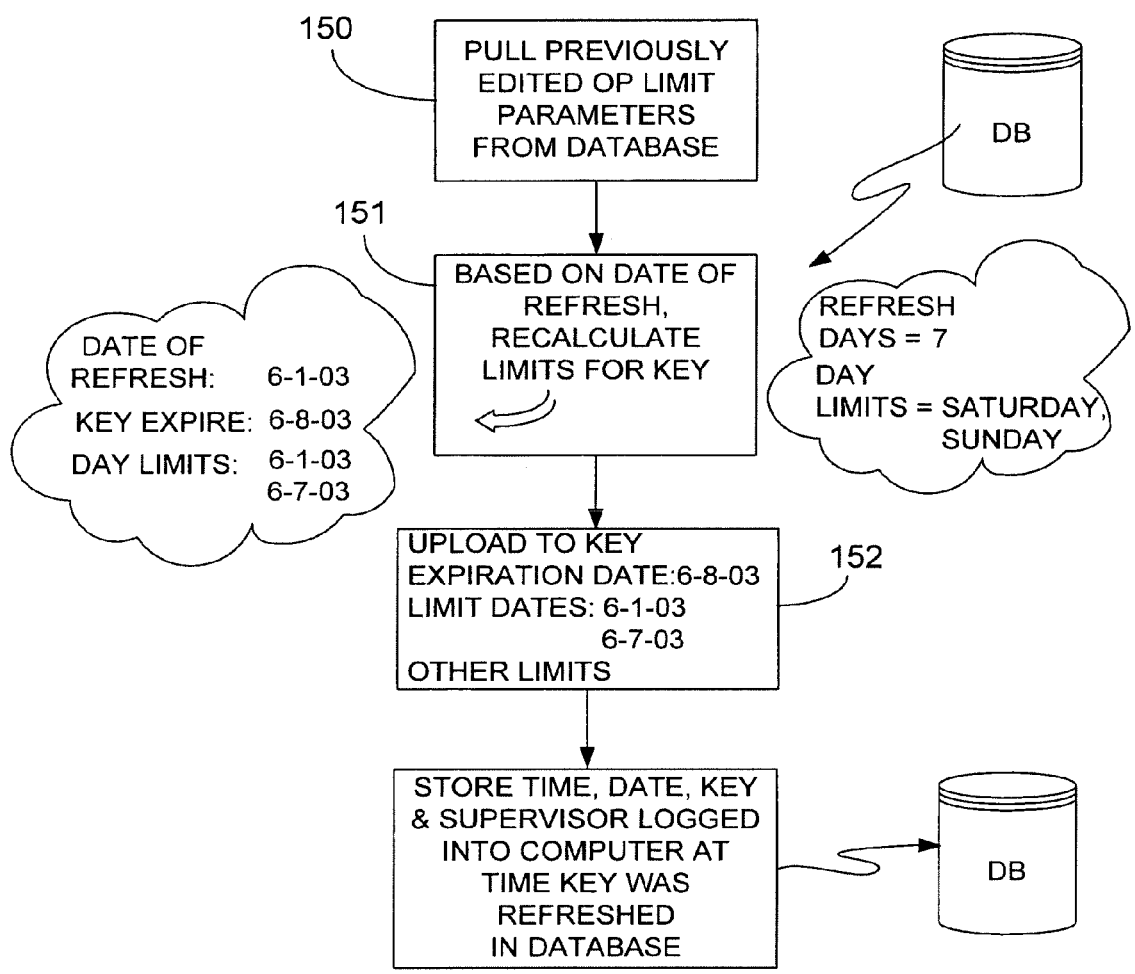
FIG. 10 is a flow chart showing a process of re-calculating key limit parameters during a key refresh operation.

Later, in a key refreshing operation, the button of the key is pressed on the key and the limit parameters are loaded into the memory of the key. FIG. 10 illustrates by way of example the process of re-calculating the limit parameters during the key refreshing operation. The program 34 takes the limits defined for the key from the database (step 150) and, at the time of refresh, using the existing date and time to calculate certain date specific limit parameters such as the date the key should expire and the days the key should operate (step 151). Last, these parameters are loaded into the key (step 152). This process allows the supervisor to maintain work schedules in the database for each employee and as long as the schedule does not change the expiration limits will be properly re-calculated at the time of each refresh. Thus, the supervisor does not need to maintain key parameters on a routine basis, as they are automatically calculated at each refresh based on the database information for each key.

It is advantageous to provide the capability of more than one docking station or cradle to service the same keys and vending machine locks. This is accomplished by providing a mechanism for either (1) multiple cradles communicating with multiple databases, wherein these databases would be synchronized and merged from time to time (FIG. 12); or (2) multiple cradles communicating with a single central database (FIGS. 13-15). The advantages and disadvantages of each configuration are described below.

Figure 12:
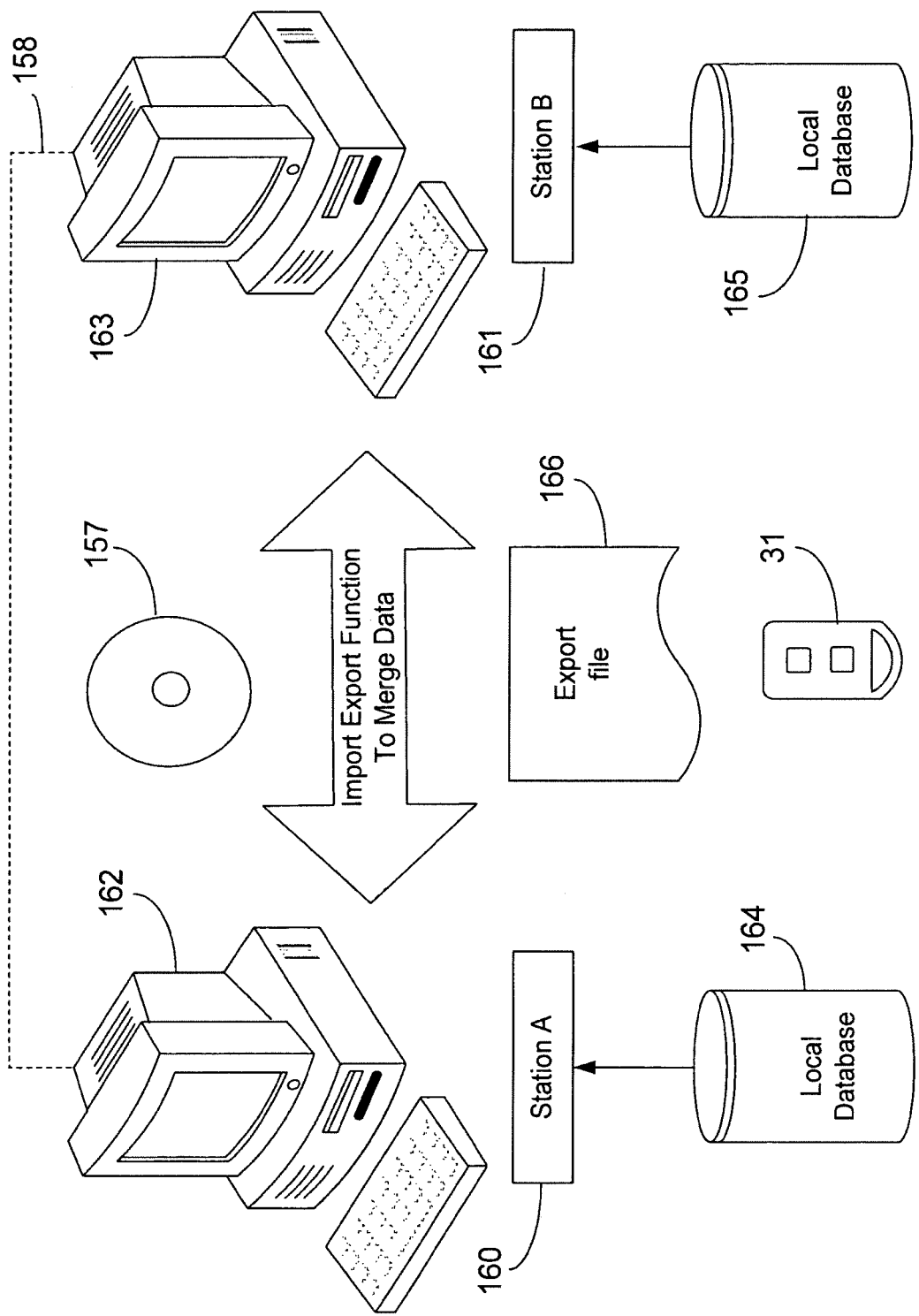
FIG. 12 is a schematic diagram showing a configuration of multiple key management databases that are synchronized using export files.
Figure 13:
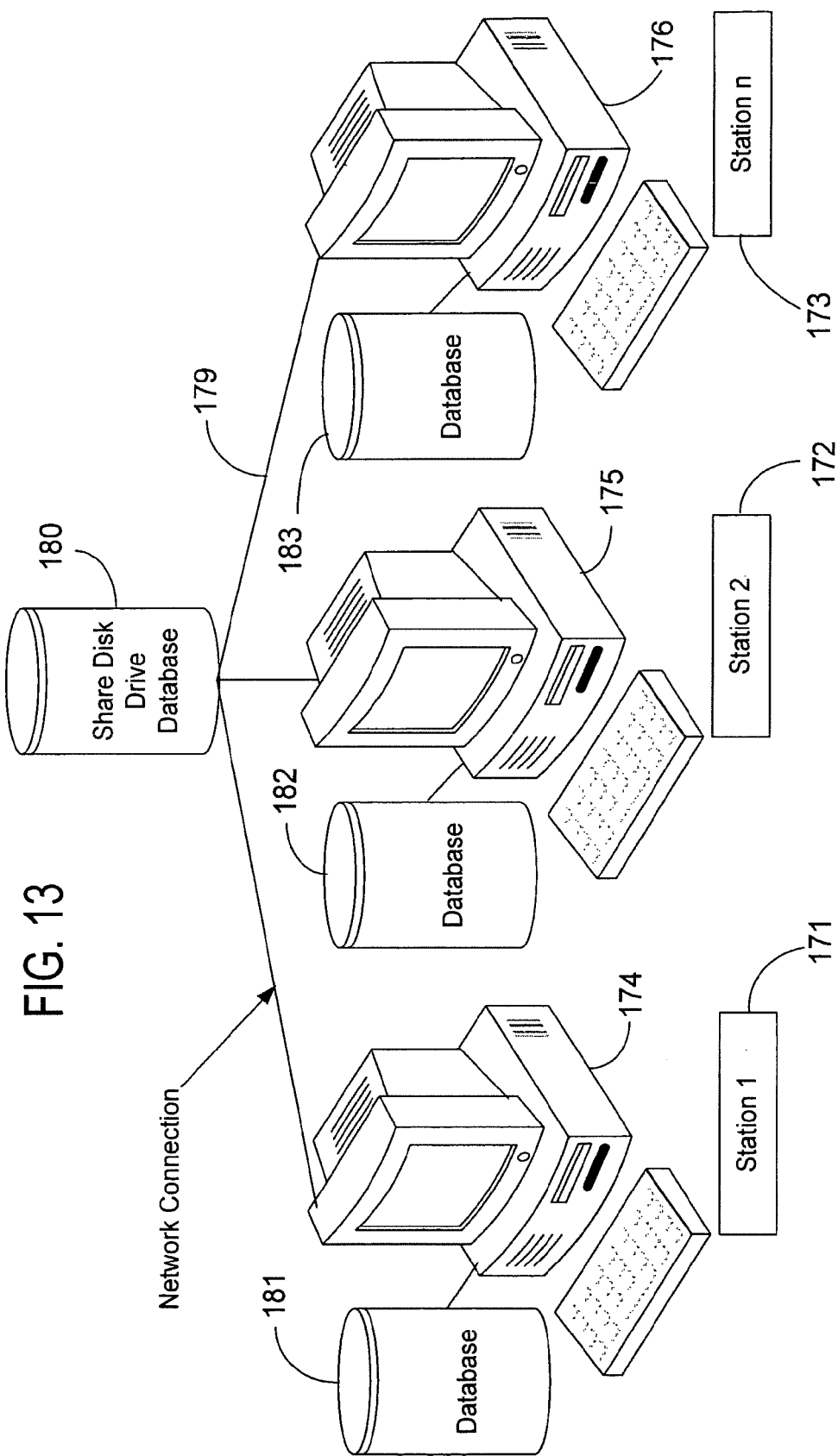
FIG. 13 is a schematic diagram showing a configuration with multiple key management stations connected via a network to a central key management database.

Multiple Cradles Communicating with Multiple Databases:

In one configuration illustrated in FIG. 12, multiple cradles are located at multiple separate locations, with each cradle interfaced to a PC containing separate databases. For simplicity of illustration, FIG. 12 shows only two cradles 160 and 161 attached to computers 162 and 163, respectively, but more cradles and computers at other locations may be included. In the illustrated embodiment, the database 164 is accessible to the computer 162, and the database 165 is accessible to the computer 163. The databases 164, 165 may be local to the computers 162, 163, respectively, or may be at remote locations and connected to the computers via network connections. It is possible to allow electronic keys to visit and be refreshed by more than one cradle/database. One way to accomplish this is to initialize each key into one cradle 160 or PC database 164. Once each key 31 is initialized, the databases 164 and 165 may be synchronized. Synchronization is accomplished by exchanging the key and vending machine lock data from one database 164 to another 165 and vice versa until all databases share the same key and vending machine lock data. This may be accomplished, for example, by creating an "export" file by the export utility from each database that contains the key and vending machine data of the database. The user interface screens 167 and 168 for this operation are shown in FIG. 16. In the screen 167, the user selects to export the database, and in the screen the user identifies the path to the database file. In the illustrate example, the export directory contains the file DBOut.mdb as the container of the export file. The export file may be stored on a transportable medium, such as a floppy disk, a CD ROM 157, a USB key, a memory card, etc. Alternatively, the export file may be transmitted to another computer via a network 158, preferably in an encrypted format to ensure the security of the transmission. This export file 166 is next presented to another computer database by using the import utility. This import utility will search for data in the export file that is not in the local database, and load this new data into the local database. If the data presented by the export file is a duplicate of data already existing in the database running the import utility, the data is not imported as a duplicate and is discarded. For example, if a vending machine lock serial number and location is in the export file 166 and presented to the database 164 by the import utility, but already exists in the database, it is not entered into the database. This import and export procedure should be executed on a regular basis and the key and vending machine data will stay consistent in each database.

Multiple cradles communicating with a single database: In an embodiment of this configuration shown in FIG. 13, multiple cradles 171, 172, 173 are located at multiple remote locations, each interfaced to a separate PC 174, 175, or 176 that has access to a shared database 180 via a network connection such as a local-area network (LAN) 179. Since there is only one database, there is no need for synchronization. In this embodiment, each cradle and PC has access to send/receive data to/from the network-centralized database 180. There are several issues about giving access to the central database 180 to more than one computer. One such issue is if two computers attempt to access the database at the same time, data could be lost or over-written. Another concern is the time it takes to access and communicate with the database. For example, if a significant amount of data must be downloaded from a key at one station, this download process could take several minutes to finish. If another key is also trying to download data and receive new access limits from another computer and cradle, the waiting time could be significant.

Thus, it is a feature of the embodiment to provide multiple cradles with access to the same database and provide a fast refresh time so employees are not delayed waiting for their keys to be refreshed. One mechanism to accomplish this is for each computer 174, 175, 176 to hold a refresh buffer 181, 182, or 183 locally in its PC in order to allow for fast refreshes during busy working hours, and during non-work hours when network traffic is minimized the PC will upload it's data in the database 180 on the network. Also in this example the local PC may use the refresh buffer as a local database, or use a separate database, for holding the key limit data. This allows fast refresh of key limits, and would store the audit trail data in the buffer. A copy of the shared database is downloaded from the shared drive by each station and stored locally. In the case the connection to the shared database 180 is interrupted, each individual station can continue servicing keys without interruption using the local database. In this mode, typically no changes or additions are allowed to the database such as key limits and vending machine information.

Figure 17:
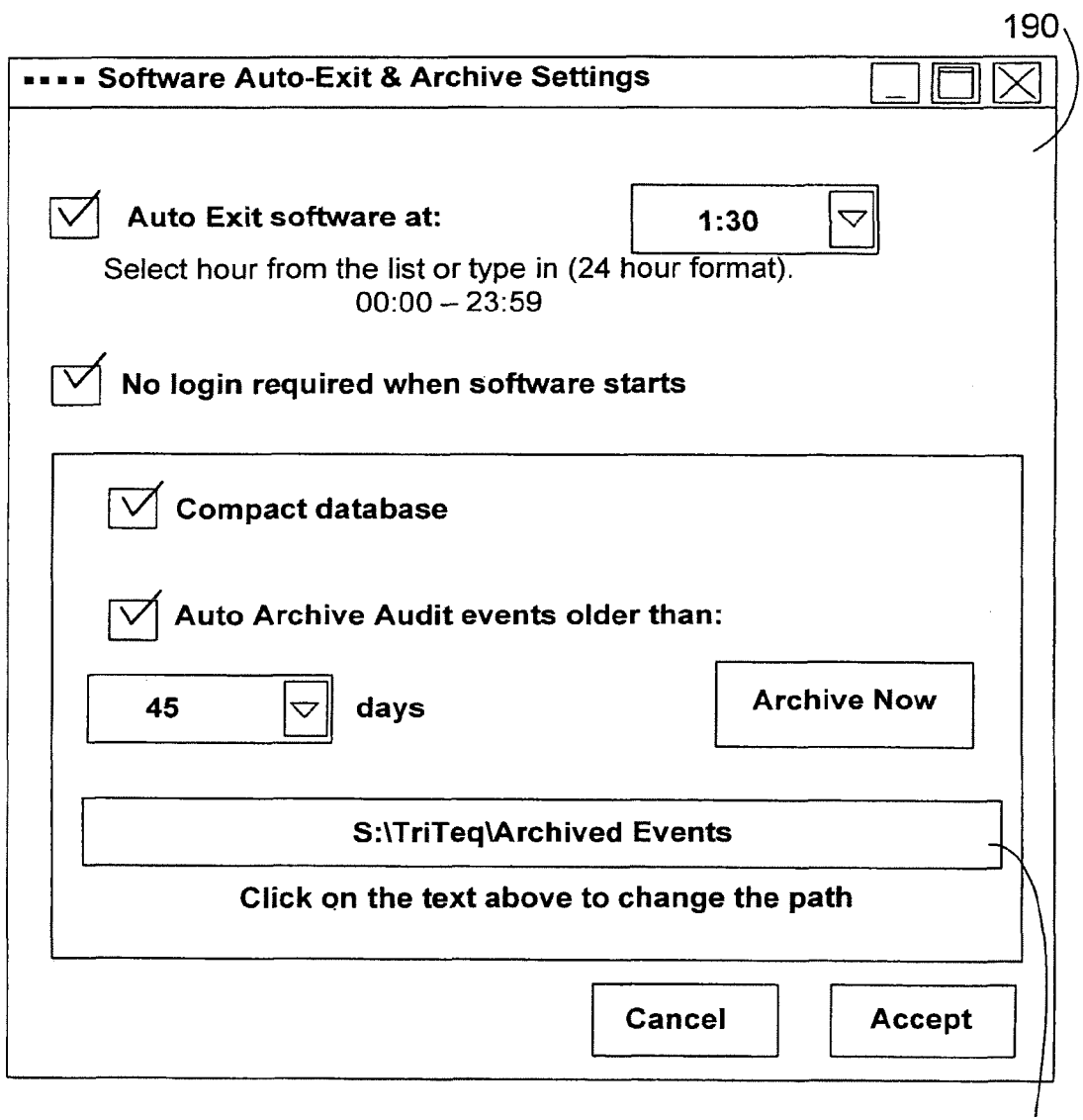
FIG. 17 shows a user interface screen for setting software auto-exit and archive settings.

Database Compacting and Archive:

Compacting and Archiving of the database are tasks that need to be executed at a frequency dependent on the amount of data that is being added to the database. The more data that is added, the more frequent these task should be executed. In one embodiment, the system allows the user to select an automatic compacting and archiving of the audit trail data. Also allowed is selecting automatic exiting of the software and automatic login of the software at selected intervals. FIG. 17 shows a user interface screen 190 for a user to select the parameters. In this example, the user selects the system will automatically compact and archive each 45 days. Also selected is the path & location of the archive 192. In addition, the system is capable of monitoring the amount of data entering the database and executing an automatic compaction and archive if a certain volume of data is moved into the database.

System Start/Exit

Figure 21:
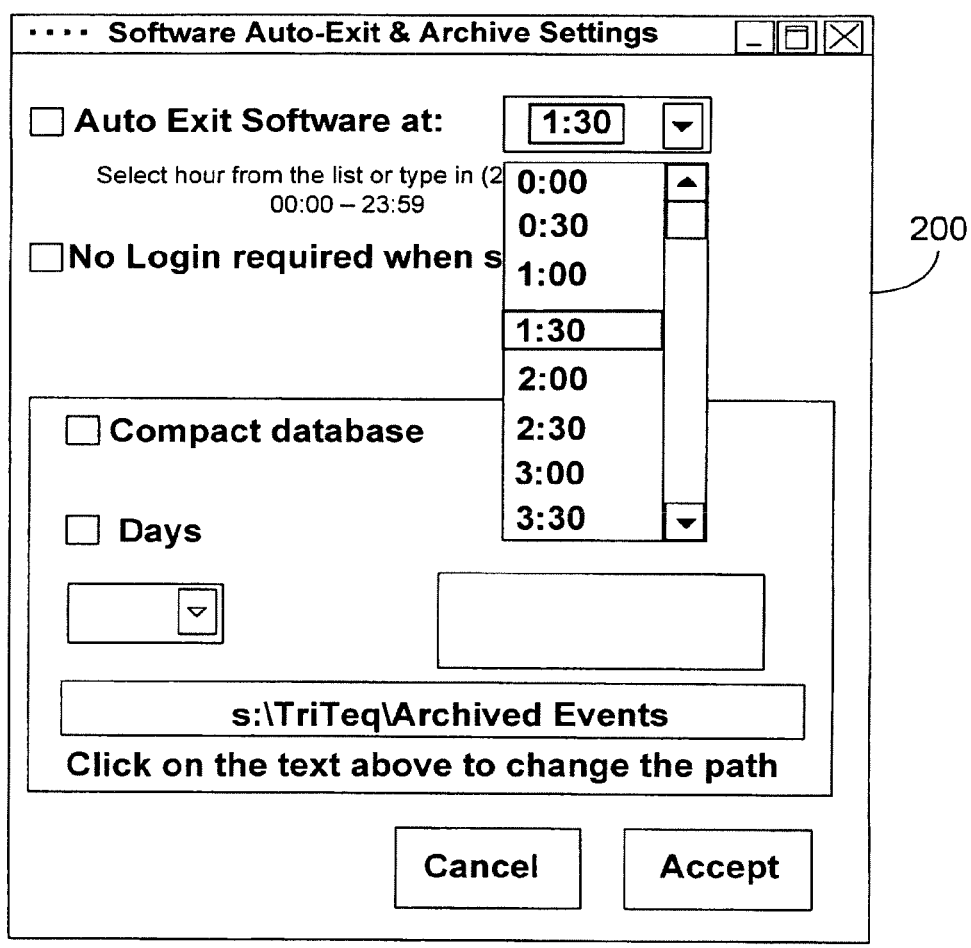
FIGS. 21-22 show user interface screens involved in setting the auto-exit time for the key management system.
Figure 22:
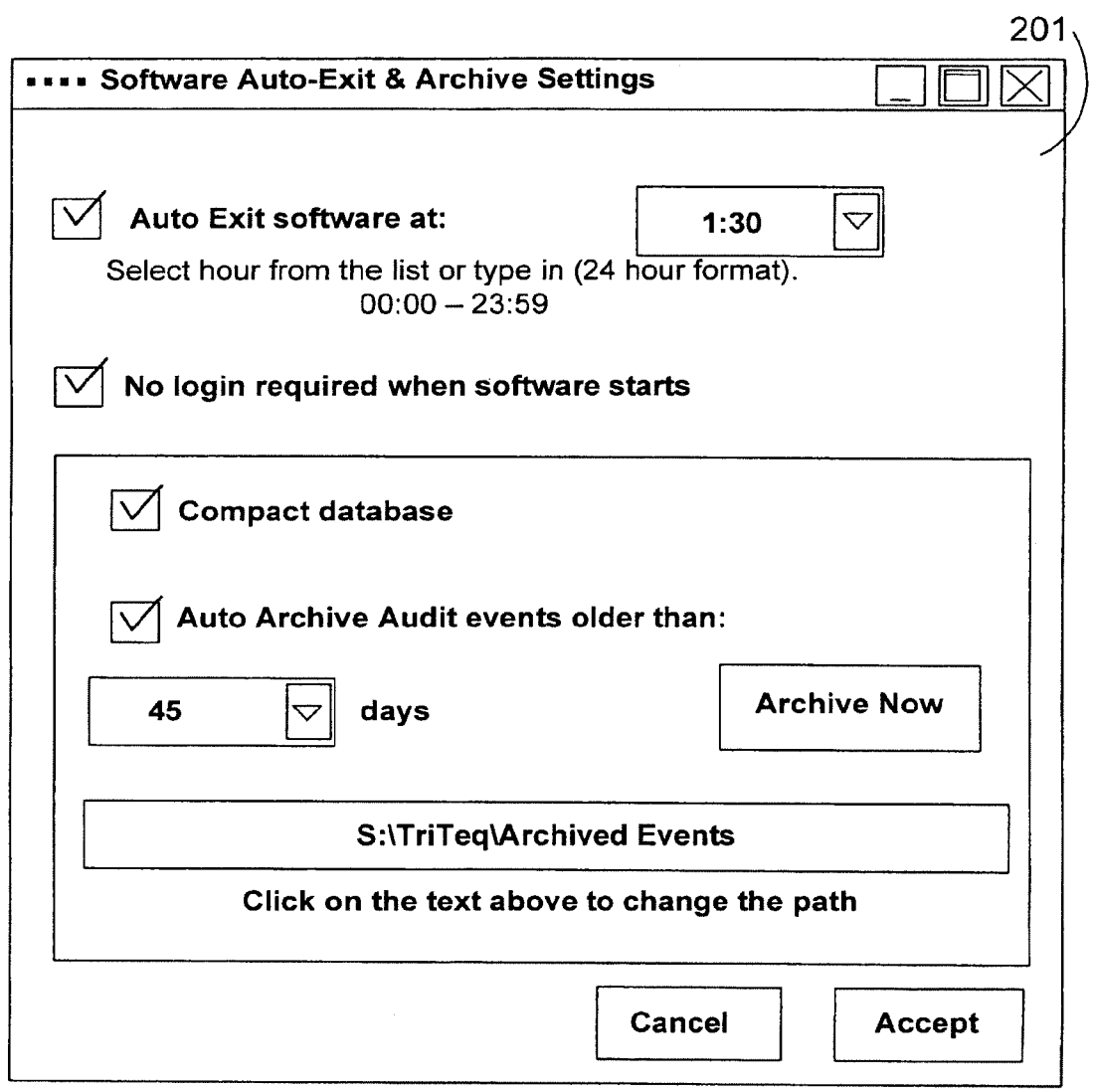

The system is capable of automatically starting up and exiting from operation on a daily basis. The start and stop times can be pre-determined and entered into the system as a scheduled task. FIGS. 18-20 show a sequence of user interface screens 193, 194, 195, 196, 197, 198 to illustrate an example of how the system is scheduled to start-up at 4:00 AM every day. FIGS. 21-22 contains user interface screens 200, 201 that illustrate an example of how the user selects the system to automatically exit from operation at 1:30 AM each day.

Figure 14A:
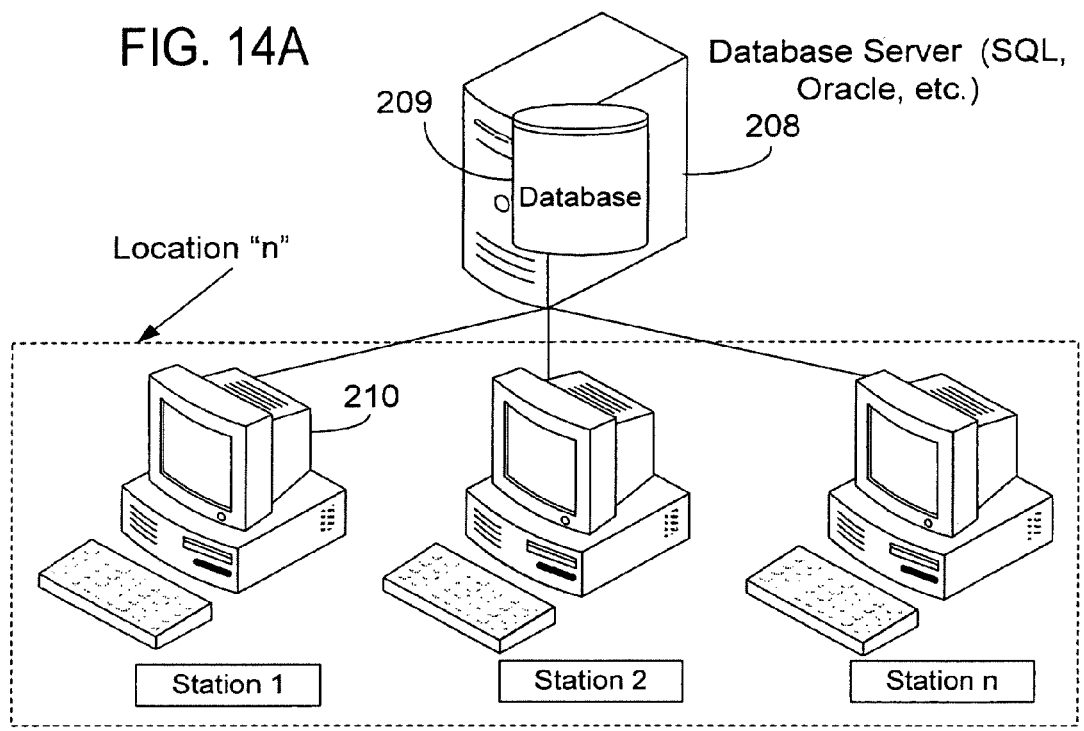
FIG. 14A is a schematic diagram showing a configuration of multiple key management stations connected to a central database with a database server.
Figure 15:
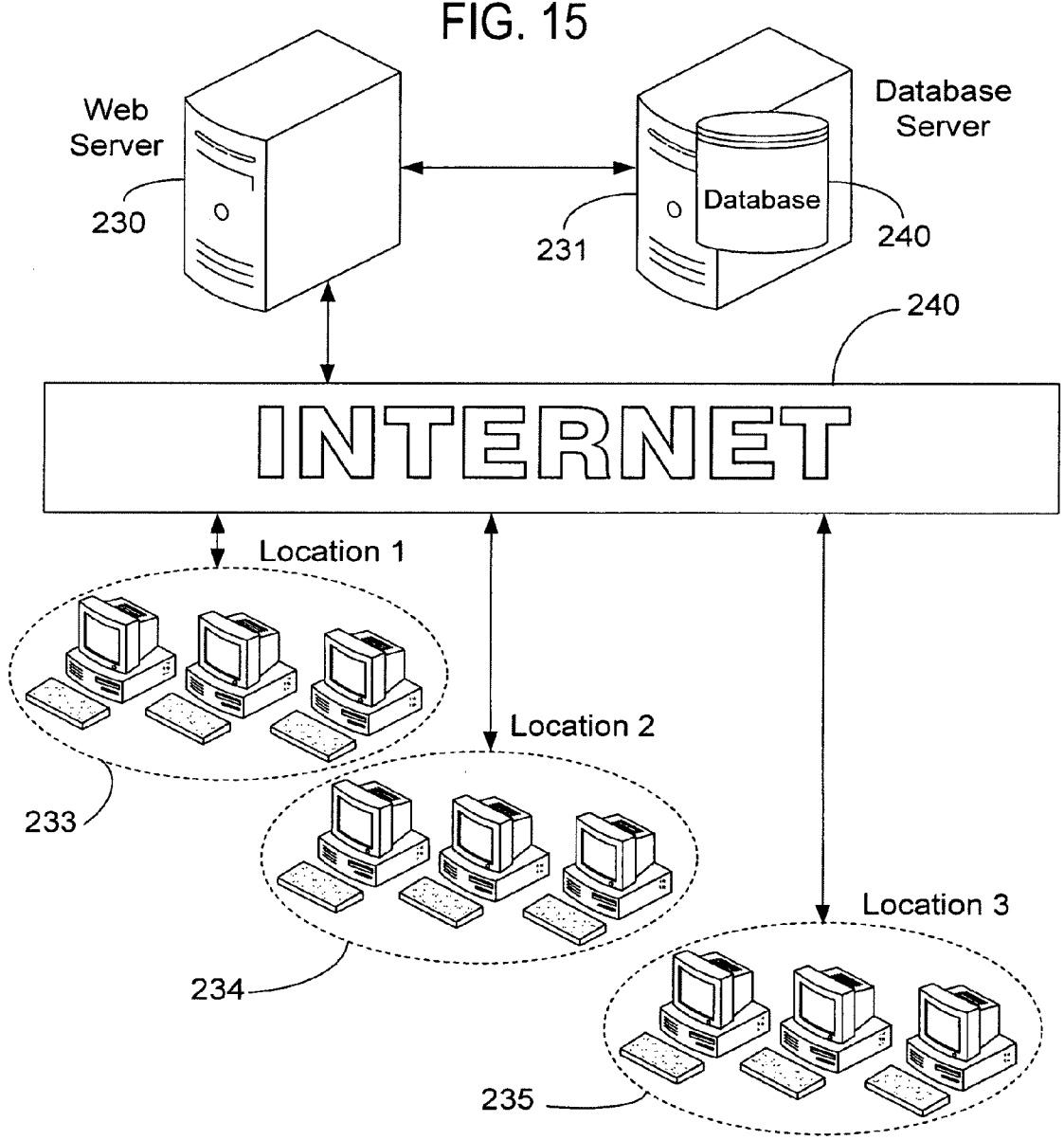
FIG. 15 is a schematic diagram showing a configuration with key management stations at different locations connected to a central database server through the Internet.

In an alternative embodiment illustrated in FIG. 14A referred to as the pre-enterprise configuration, the single database configuration uses a dedicated database server 208. This configuration contains all of the above-described features from the LAN network single database embodiment, while each station is allowed to access a dedicated database server 208 (SQL, Oracle, etc). A local station 210 connecting to the database 209 will be accomplished using the standard "Data Source (ODBC)" included in all Windows operating systems. After connection to database is accomplished, the user uses the key control operation features the same as in the previous configuration. Potential advantages of this configuration are increase database reliability, faster response time on accessing, changing, or adding records to the database, and significantly less data traffic.

Figure 14B:
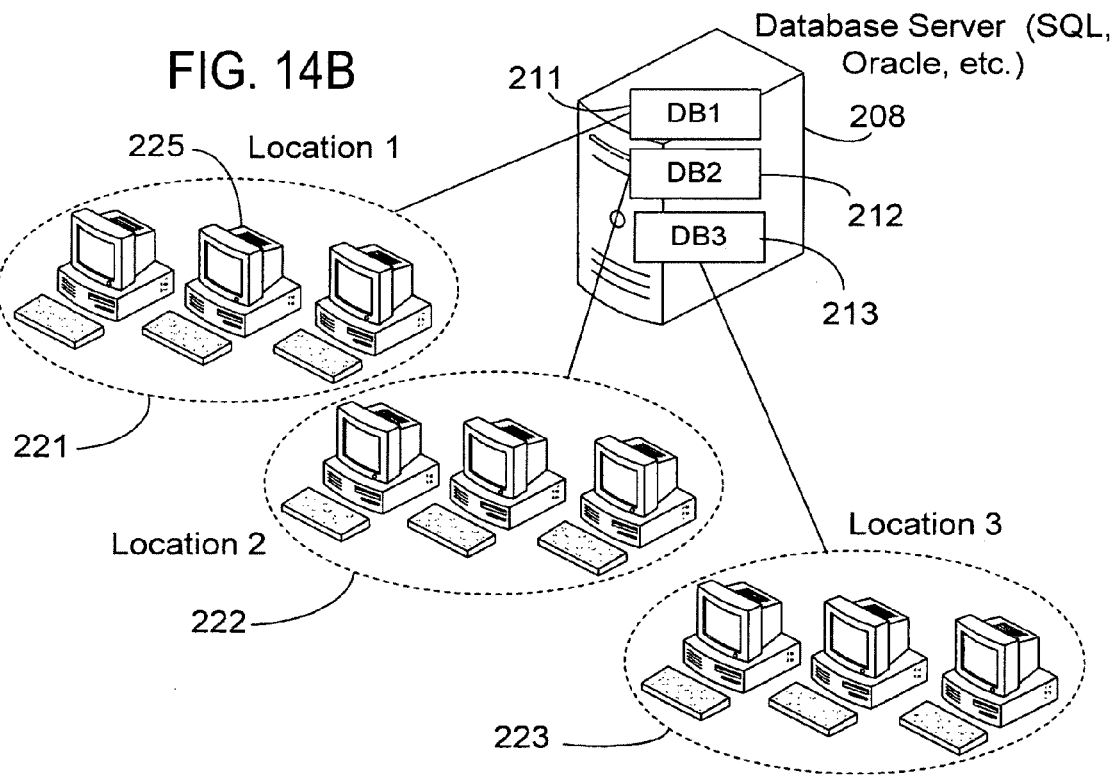
FIG. 14B is a schematic diagram showing a configuration of key management stations at multiple remote separate locations connected to a central database server with multiple databases for the separate locations.

Referring to FIG. 14B, the added capacity of a dedicated database server 208 can be used by mounting multiple databases 211, 212, 213 for serving multiple locations 221, 222, 223, respectively. In such instances the databases 211, 212, 213 can be identified by the specific city code, or group of city codes each database represents. A location can be, for instance, a cluster of bottling stations and/or a bottling station and several satellite locations. Stations from each location are assigned rights to access only the database they are associated with. For instance, computers at the location 221 may access only the database 211, and computers at the location 222 may access only the database 212. This configuration adds the benefit of creating global access reports that will include reports from all locations. Another benefit of this configuration is the option of remote control and administration of database from a remote location. For example, if appropriate rights are assigned to Station 225 at Location 221, this station can manage keys, users and vending machines at location 221 as well as the other locations. By using a LAN type network, the security of this configuration should adequately prevent hackers from gaining access to the database and the security of the system.

In another alternative embodiment of the single database configuration illustrated in FIG. 15, a web server 230 connected to a database server 231 is used. This configuration is referred to as the Enterprise configuration. Each of the individual stations uses a simple web browser (e.g., Internet Explorer, Netscape, Opera, etc.) to communicate with the web server 230 to access the database or databases 240 maintained by the database server 231. In this way, the individual stations can accomplish functions related to key refresh, adding keys and users, adding vending machines and asset numbers, and modify key settings as in the previously described configurations. In the event of lost Internet connection, the stations in this configuration operate a simplified version of the software as described in FIGS. 13 & 14 for refreshing keys while the connection with the web server 230 is severed. One benefit of this configuration is the ability to use the Internet infrastructure to create a wide-area network for remotely operating the stations and thus eliminate the need to support a separate or dedicated structure to accomplish the same. Another benefit of this configuration is that software updates for the functionality of the stations as well as adding and deleting stations will be done in the web server and may not require user intervention at the station when these tasks are performed. One potential disadvantage is that hackers may attempt to get access to the database since the network is accessible to almost anyone with a browser and access to the web.

Figure 23:
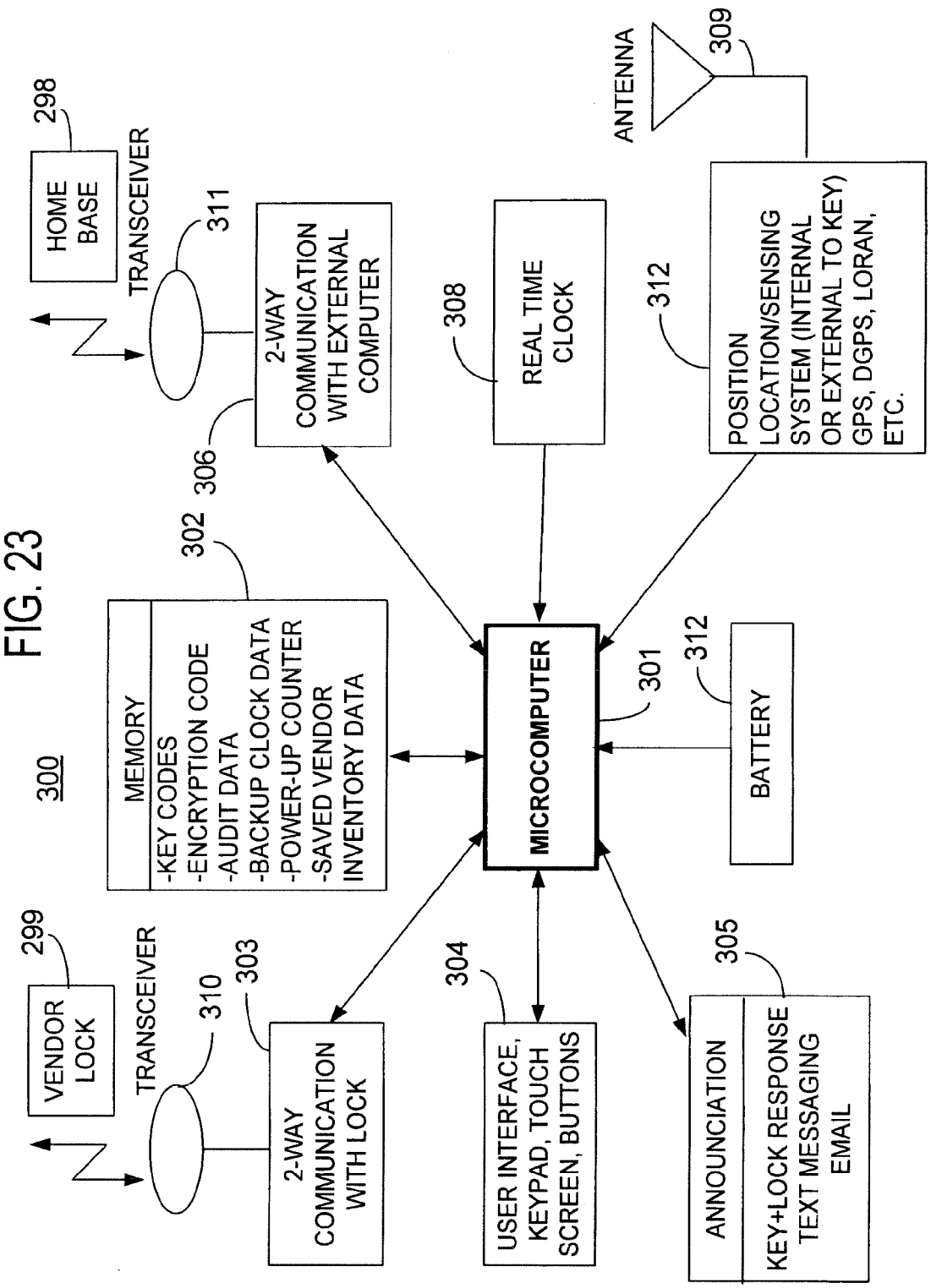
FIG. 23 is a schematic diagram showing in functional blocks an electronic key that has a position sensing component for detecting the locating of the electronic key during field operation.

An enhanced electronic key may be provided with additional hardware and software features to enhance the security, tracking, audit data control, and assisting of the employee to fill and service the vending machine. FIG. 23 is a functional block diagram of the enhanced electronic key 300. The key 300 has a microprocessor or microcomputer 301, a non-volatile memory 302, a real-time clock 307, and a battery 312 for powering the components of the key. The memory 302 may contain software and data required for the operation of the key, such as key codes, an encryption code for use in encrypting and decrypting communications with an electronic lock, encryption/decryption algorithms, backup clock data, power-up counter. The key memory may also contain data collected form vending machines, such as access audit data and vending machine inventory data.

The key 300 includes a two-way communication module 303 with a transceiver 310 for two-way communications with the electronic lock 299 of a vending machine. The key may also include user interface features 304 such as a keypad, touch screen, or buttons with specific functions. An annunciation component 305, such as LCD screen, may be included for displaying key-lock responses, text messaging, email, etc. The key may include another two-way communication component 306 that has a transceiver 311 for communicating wirelessly with a home-base 298.

As a feature of the embodiment, the electronic key 300 may further include a position sensing component 308 for identifying the current location of the key. This component, which may include an antenna 309 and may be internal or external to the key, may be based on one of the positioning systems such as GPS, DGPS, LORAN, etc.

The advantage of including the position sensing system component 308 in the key is that ability to track the location of each key used to access the vending machines. For example, electronic keys that include location tracking would pinpoint the geographical location of each vending machine the user of the key was attempting to access. Thus, and audit event for an access attempt would consist of the user of the key, the key code, the date and time of the attempt, the limits (if any) of the key, the serial or ID number of the vending machine, and the physical location (preferably at least 2-dimensional latitude and longitudinal coordinates, and possibly the third dimensional or altitude coordinate) of the vending machine being accessed. These coordinates could be translated by computer to common street address and location (for example, 100 W. Plainfield Rd, Countryside, Ill., second floor, suite 202).

When an electronic key has the capability of obtaining the location coordinates of a vending machine (either by receiving these coordinates itself by a position sensing system or by communication with a position sensing system at the vending machine location), the previously described step of reading the serial number of the vending machine (with a reader tool, or a bar code reading device, or by the electronic key) and entering the vending machine location data into the computer 32 manually may be eliminated. Since the electronic key will produce or receive the location coordinates at the time it attempts to access the vending machine, this data can be provided to the database as the vending machine location in lieu of a manual entry, which is subject to human error.

An additional benefit of the position sensing feature in the electronic key 300 is the ability to keep track of and/or locate keys if they are lost or stolen. Since this key has the data exchange feature described above, it can transmit its location coordinates to the central or home-base location or to a person possessing a computing device that would receive the location information.

An additional feature of this key 300 is the data transfer capability. In additional to its capability of transferring data in short range to the docking cradle (as described for other keys in this system) this key may be equipped with the capability to transmit and receive data over longer distances. Thus, as a key is being operated the audit data and the vending machine sales and inventory data would be transferred back to a central or home-base location. The enhanced communication capabilities would include text messaging and email in order for the person using the key to send and receive information concerning the route they are working on, changes and additions, reports, etc.

Monitoring and/or Tracking Keys and Other Items

The present invention is directed to a security system and method for monitoring the locations of mechanical keys or other access control devices, and to provide secured storage for the keys. Although the security system and method of the invention are especially advantageous for managing access and use of mechanical keys, they can also be used to monitor and control access to other types of valuable items.

In another implementation based on the embodiment described in FIG. 23, the electronic key 300 utilizes the GPS position data to decide if it is enabled for operation. To that end, the electronic key 300 includes additional registers or memory space for storing limiting parameters concerning the relative position of the key for deciding whether the key should be enabled or disabled. The position limiting parameters may, for example, specify the coordinates of areas in which the key 300 is allowed to be used to access locks of vending machines. The position limiting data may be downloaded to the key 300 during a refresh operation when the key is placed in the cradle of the key management system (e.g., at the bottling facility) as described earlier. Alternatively, the position limiting data may be received by the key 300 wirelessly via the transceiver 311 when the key is in the field. In operation, the GPS receiver 308 receives position data indicating the current position coordinates of the key 300, and forwards the data to the processor of the key. The key 300 compares the received position data with the position limiting data stored in it to determine whether the key is in a valid territory for operation as specified by the position limiting data. If the key is in a valid territory for operation, when key is actuated by the user, it will proceed with the unlocking operation, if the other operation limiting parameters are not exceeded. If, however, the key is not located in a valid territory, it will enter a disabled mode and cannot not used for accessing locks. If the key is later moved into a valid territory, it receives updated position coordinate data from the GPS receiver and determines that it is now in a valid territory, and returns to the enabled mode so that it can be used to access locks.

Figure 24:
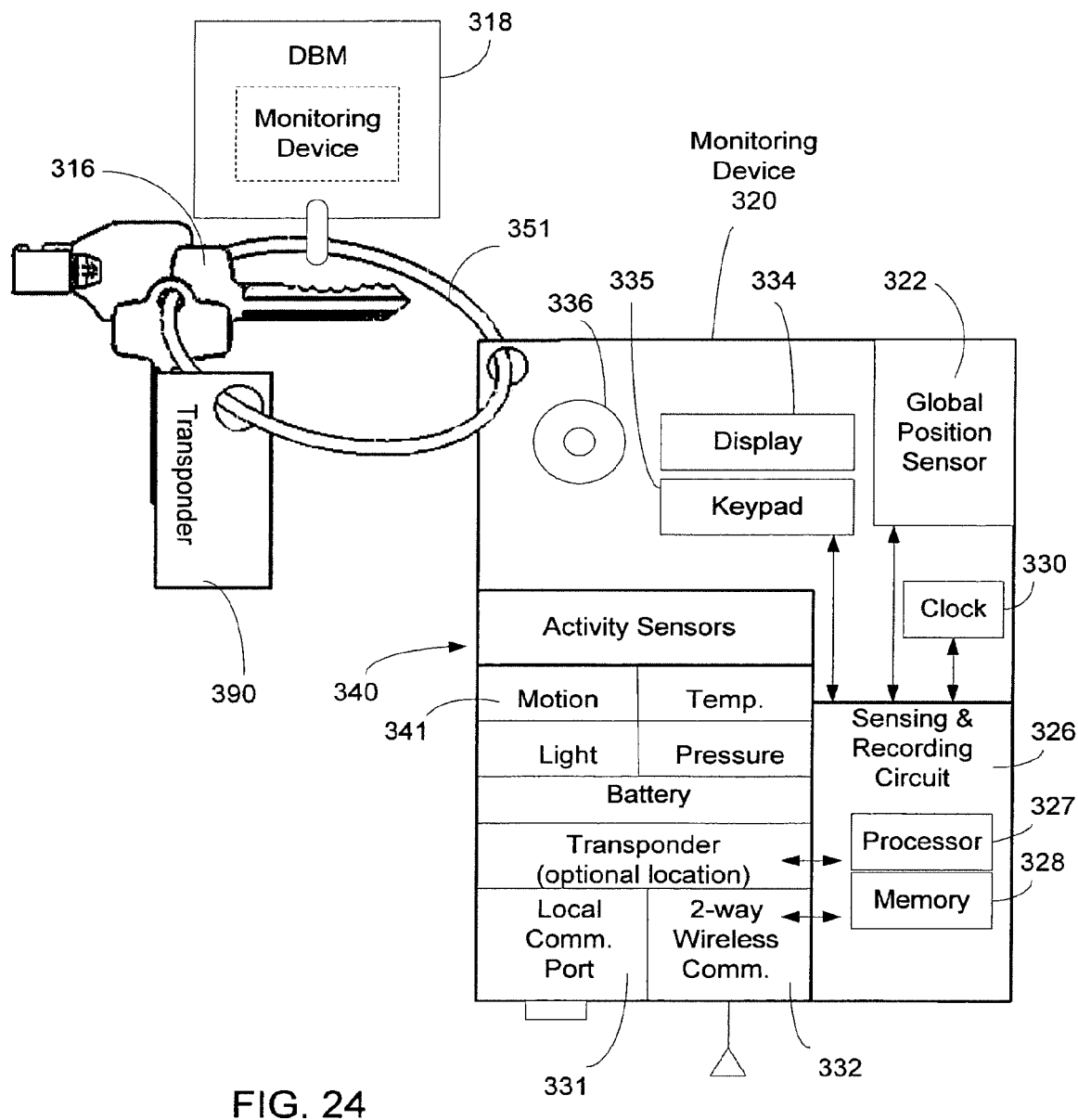
FIG. 24 is a schematic diagram of a monitoring device with location detection capability that is attached to items being monitored.

Turning to FIG. 24, in accordance with a feature of one embodiment of the invention, a monitoring device 320 is provided to allow the tracking of the whereabouts of access control devices, such as mechanical keys 316, so that the locations of the access control devices at different times can be monitored either in real time or audited at a later time. It will be appreciated, however, that the monitoring device 320 can also be used to track the locations of other valuable items such as remote control devices, fire arms, tools, appliances, etc. The monitoring device 320 is equipped with the capability of identifying its location, which may be implemented in different ways. In the embodiment shown in FIG. 24, the monitoring device 320 is equipped with a Global Position System (GPS) device 322 for identifying the current location of the monitoring device. Other types of positioning devices/systems can also be used. The monitoring device 320 also has a digital sensing and recording circuit 326 that includes a microprocessor 327 and a memory 328. The sending and recording circuit 326 allows the monitoring device to detect the current location through the GPS sensor 322, and record the location data in the memory 328 for auditing purposes. A clock 330 provides time information, which may stored in the memory as part of the location and event records.

As shown in FIG. 24, the monitoring device 320 is attached to or associated with the mechanical keys 316 or any other device being monitored (hereinafter sometimes referred to as "DBM"), such as the device 318. Due to the association between the monitoring device 320 and the items to be monitored, the location of the monitoring device is also that of the items being monitored. To that end, the monitoring device 320 is preferably attached to the mechanical keys 316 and other DBM's in a way such that they cannot be easily separated. The means 338 for attaching the monitoring device 320 and the items being monitored may be, for example, a steel cable or closed ring. Alternatively, the monitoring device 320 may be built into a device being monitored 318, instead of being a physically separate device.

The monitoring device 320 is used to monitor, record, and annunciate the location and activity of the devices being monitored, such as the mechanical keys 316. The recording circuit 326 tracks the location of the monitoring device (and thus the location of the keys 316) and records in the memory 328 the locations at different times. Thus, the recorded data provides a history of where the monitoring device 320 and the items attached thereto have been. The recorded data preferably includes the date and time of the sensed locations. In addition, the recording circuit 326 may also record the date and time of any detected activity of the devices being monitored.

To enable the monitoring device 320 to communicate with other devices, the monitoring device further includes a communication port 331 and a transceiver 332, which preferably transmits and receives signals via a wireless band, such as infrared or radio frequency. The communication port 331 allows a computer to download the position and time data from the monitoring device 320 at a convenient time. For example, after a driver for a vending machine route returns to the company at the end of the day, the data from the monitoring device 320 attached to the keys 316 assigned to that driver can be downloaded to a system management station like the one in the embodiment shown in FIG. 1. In this way, it can be determined whether the driver has stayed on the vending machine route as scheduled or has deviated from that route. If real-time location monitoring is desired, the wireless transceiver 332 can be used to transmit the location data in real time to a remote receiver, such as one located at the company.

The monitoring device 320 can also be used to monitor and record other information that may indicate the activities occurring to the items being monitored and whether there have been attempts to tamper with the items. For example, events or conditions that are electronically measurable, such as the motion, temperature, barometer pressure, and ambient light, etc., can be sensed by respective sensors 340 in the monitoring device 320 and recorded for later analysis. Also, if the GPS sensor 322 is not in operation or has been disabled or cannot receive a signal, the monitoring device 320 can rely upon the activity sensors 340 to detect activities or changes of conditions. Thus, in this sense, the activity sensors 340 can be used to supplement the location identification by the GPS sensor 322 to provide more information that can be used to determine what may have happened to the items attached to the monitoring device. The parameters detected by the activity sensors 340 can be recorded locally (i.e., into the memory 328) and downloaded at a later time for analysis. Alternatively, the parameters can be transmitted by the wireless communication component 332 to a remote receiver to provide real-time information about activities concerning or surrounding the devices being monitored.

For purposes of interfacing with a user, the monitoring device 320 has a display 334 for displaying information and a keypad 335 that can be used to enter data and commands. An audio annunciator 336, such as an audio transducer or a buzzer, provides auditory information which may be used to indicate the various states of operations.

In accordance with another aspect of the invention, a security container with an electronic lock system and a closure that may be used to store the mechanical keys or other items in a secured manner to protect them unauthorized access. The security container is configured to ensure that the mechanical keys or other items to be protected are actually present in a secured location within it. The secured container is especially useful for storing items that are frequently taken out from and returned to it. For example, a driver for a given route of vending machines may receive the mechanical keys 316 for accessing the vending machines at the beginning of a workday, and return the keys to the company at the end of the work day by placing the keys into the secured container. The security container of the invention can be advantageously used to store the returned keys and to record the time the keys are returned and the time the keys are taken out again. A detection mechanism of the security container ensures that the keys are actually placed in the container and stay in the container until the next time the keys are taken out.

In one embodiment shown in FIGS. 25A-D, the security container is in the form of a safe 350, and the closure is a drawer 352. The safe 350 is illustrated in FIGS. 25A-D in a top view as a cabinet. The drawer 352 is movable between an open position as shown in FIG. 25A and a closed position as shown in FIG. 25B. In this embodiment, the safe 350 does not have a door, although a door may be added to provide further protection from attempts to physically break into the safe. Items 353 to be protected, such as mechanical keys, are placed into the drawer 352 when the drawer is in the open position. The drawer 352 is then closed with the items to be protected in it. In this way, the items to be protected are placed in a secured position before the safe can be locked. The term "secured position" as used herein means that the items in that position are not accessible from outside the security container. Placing the items in the secured position, however, does not mean that they are locked in that position. For example, as shown in FIG. 25B, the space in the closed drawer 352 represents the secured location, but the drawer may not be locked at that point and thus may still be pulled to expose the items to be protected. It will be appreciated that a closed drawer in a safe is only one example of providing a secured position, and there are many other ways to provide a secured position depending on the detailed implementation of the security container.

In accordance with a feature of the invention, the security container is configured such that it does not lock up unless the items to be protected are detected in the secured position. This feature ensures that the items to be protected are actually placed in the security container. It prevents, for example, a dishonest employee from pretending that he has returned the mechanical keys assigned to him to the safe 350 by opening and closing the drawers 352 without actually leaving the keys in the drawer.

To detect the presence of the items to be protected, the safe 350 is provided with a detector 356. By way of example, in FIG. 25B, the drawer 352 is closed with the items 353 to be protected in it. The detector 356 of the safe then tries to detect the presence of the items 353 to ensure that the items are really in the drawer 352. If the items 353 are detected in the drawer in the closed position (i.e., the items are in a secured position), the safe 350 locks the drawer in the closed position, as illustrated in FIG. 25C. In this embodiment, the locking is by means of a latch 354 of the electronic lock 355 of the safe. An audit trail record is created for the locking event to indicate that the items 353 have been locked in the safe. Later, the safe may be unlocked using an authorized electronic key 358, and the drawer 352 may be opened to allow retrieval of the items 353, as illustrated in FIG. 25D. Another audit trail record for the unlocking event may be created to indicate that the safe has been unlocked to allow removal of the items 353. The audit trail records for the locking and unlocking events may be stored in the memory of the electronic lock of the safe and later transferred to a computer system for auditing.

On the other hand, if the drawer 352 is closed, but the detector 356 cannot detect the presence of the items 353 inside the drawer, the safe 350 will not lock the drawer, and will not record a locking event. As a result, the items can still be accessed by opening the drawer, and the person attempting the locking event is still responsible for the security of the items as he has no proof that the items has been locked in the safe.

Figure 26:
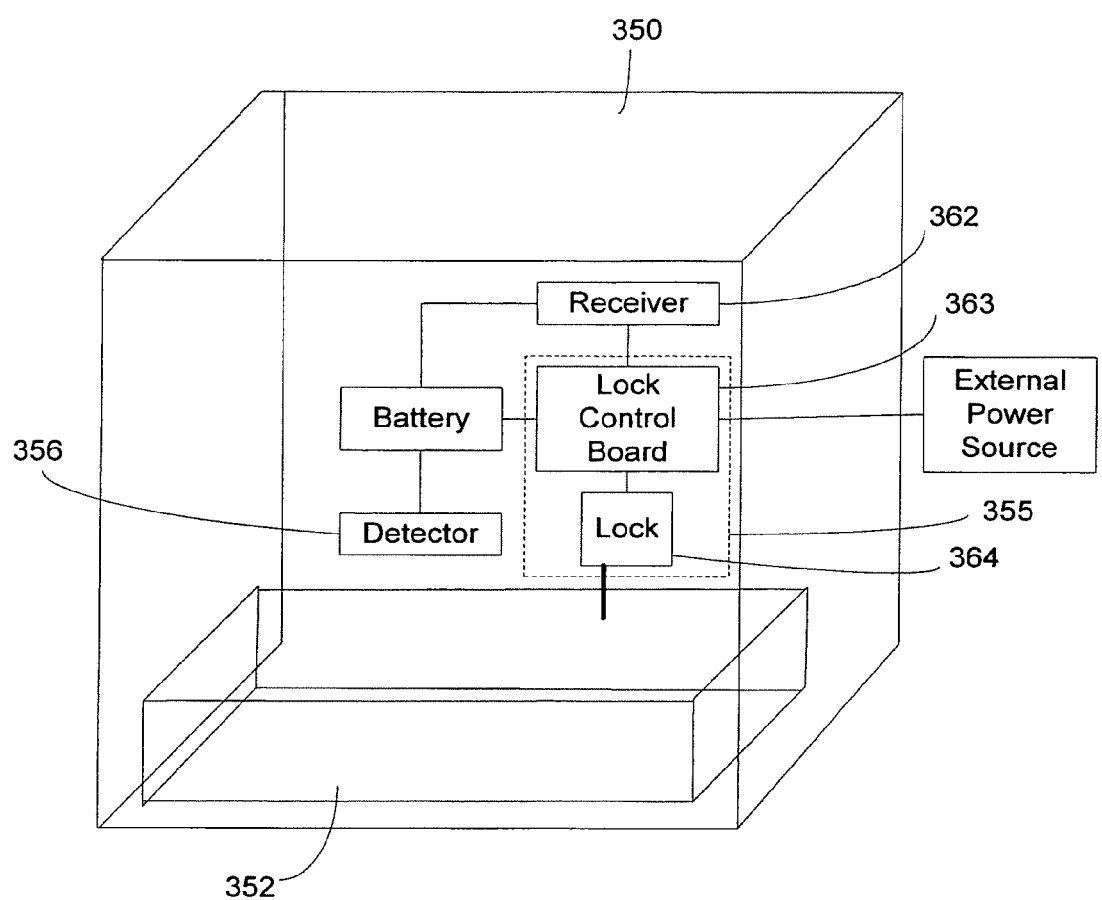
FIG. 26 is a schematic view of the safe in the embodiment of FIGS. 25A-D with electronic components for monitoring the presence of valuable items in the safe.
Figure 27:
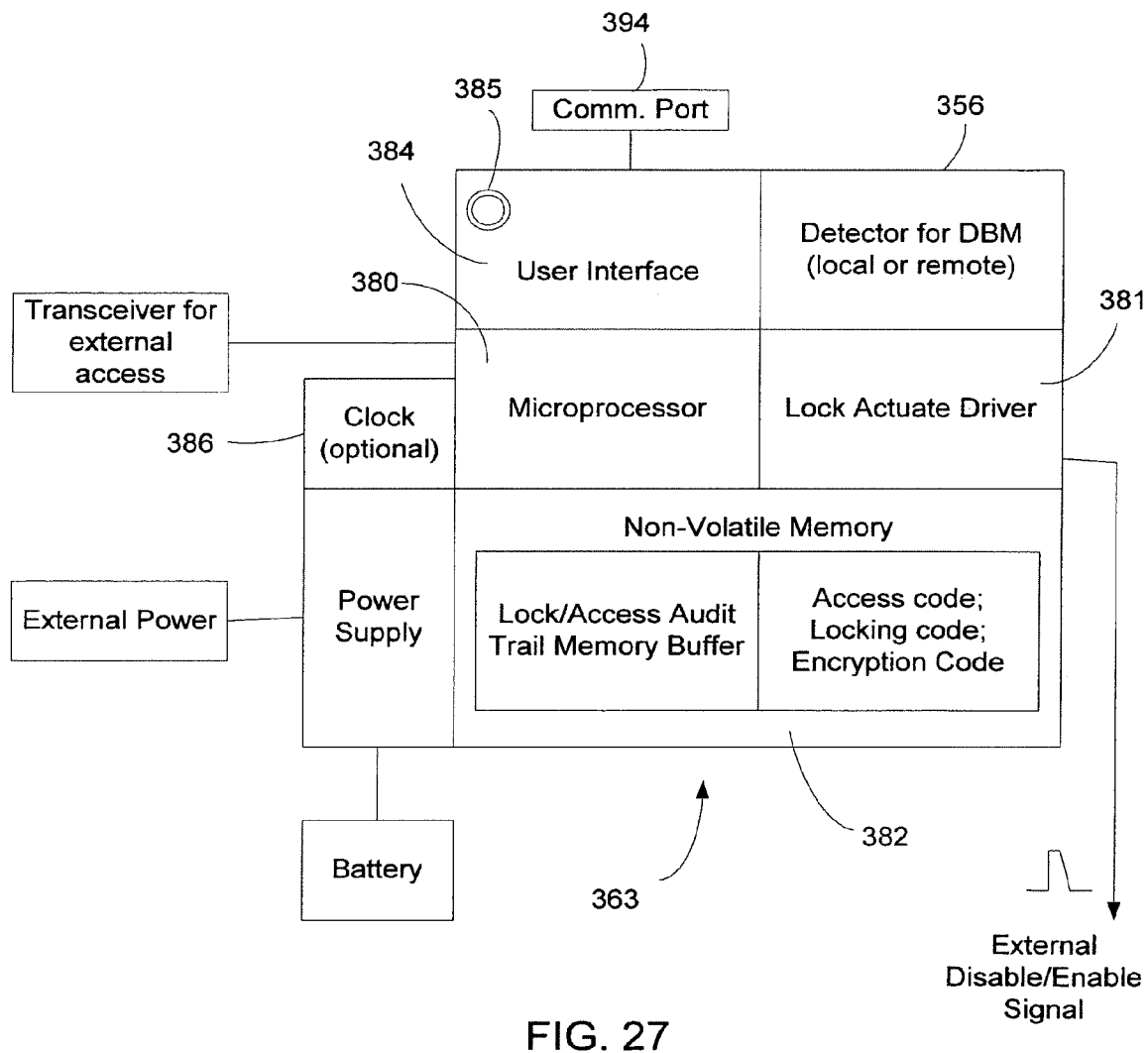
FIG. 27 is a functional block diagram showing features of an electronic lock control board of the safe in FIG. 26.

The electronic lock 353 of the safe 350 includes a locking mechanism 364 controlled by a lock control circuit 363 as shown in FIG. 26. A receiver or transceiver 362 allows the lock control circuit to receive an access code from an external access control device such as the electronic key 358 shown in FIG. 25. Referring to FIG. 27, the lock control circuit 363 includes a microprocessor 380, a lock actuator drive 381 controlled by the microprocessor for actuating the lock, and a non-volatile memory 382 for storing data. The data stored in the memory 382 may include an access code for unlocking the safe, a locking code that when received from an external device will trigger the actuation of the lock, and encryption codes for encrypted communications. The memory 382 further stores audit trail data for the lock/access events of the safe. The lock control circuit may also have components for user interface, such as push buttons for various functions.

To detect the presence of the items to be protected, the safe lock control circuit 363 further includes a detector 356, which may be placed together with the rest of the circuit or at a separate location in the safe, depending on the detection mechanism used and the physical layout of the safe. Returning to FIG. 25, the detector 356 detects the presence of the items to be protected when the items are placed in the secured position. In the embodiment shown in FIG. 25, this means that the detector 356 will detect the items 353 when they have been placed in the drawer 352 and the drawer is closed.

Various ways may be used by the detector to detect the items to be protected. For instance, the detector may use optical sensors to detect the presence of the items.

Alternatively, in a preferred embodiment, the detector may cooperate with an identification device attached to the items 353 to facilitate the item detection. The identification device may transmit signals, interact with the detector via two-way communications, or otherwise enable the detector to determine its presence. Since the identification device is attached to the items to be protected, the detection of the identification device by the detector is an indication that the items to be protected are also present in the secured location. The identification device may be attached to the items to be protected by different ways, such as by means of gluing, strapping, mechanical fastening, chaining, etc., to provide a reliable association between the items 353 and the identification device.

In the embodiment shown in FIGS. 25A-D, the identification device is a transponder 390 attached to the items 353 by means of an attachment device 351, such as a ring. The transponder 390 may be an item different than the items 353 to be protected, or may be built into the items to be protected. The transponder 390 may transmit and receive signals to and from the detector 356 to allow the detector to sense its presence. The communications between the detector and transponder may be implemented in different ways, such as via a cable or through wireless transmissions in infrared or radio frequency. To enhance the security of the system, the communications may be encrypted, using encryption codes stored in the lock memory 382 and the transponder 390. The use of encrypted transmission would prevent a dishonest person from creating a fake locking event by placing an unauthorized transponder in the safe to deceive the detector.

In this regard, the transponder may be a part of an electronic key similar to the electronic keys for vending machines as in the embodiments described earlier. The electric key may be, for example, put on the same key ring with the mechanical keys. When the keys are moved to the secured position, the detector 356 communicates with the electronic key to determine that a valid transponder has been put in the secured position, and then locks the drawer 352 so that the electronic key with the mechanical keys attached to it are locked in the secured position.

Optionally, a location identification device, such as a GPS device, may be attached to the items to be protected to allow detection of the location of the items in the safe. This location identification device may be integrated with the transponder 390, or may be a separated device. For example, FIG. 25A shows a monitoring device 320 optionally attached to the items 353 to be protected. As mentioned above, the monitoring device 320 may include a GPS sensor for location identification. The GPS sensor in the monitoring device allows the detection and recording of the location of the items attached to the monitoring device 320. The location of the safe can also be monitored this way, if the safe is being moved around, for example in the case where the safe is mounted in the vehicle of a driver for a vending machine route, or in the case where the safe has been stolen and removed from its normal location.

In accordance with a feature of the invention, to prevent falsification (or "spoofing") of item detection, it is advantageous to make the communications between the detector and the transponder short-ranged or directional, so that the detector can detect the presence of the transponder only when the transponder is placed in the secured location in the security container. For example, in the embodiment in FIG. 25B, the detector 356 can detect the transponder 390 only when the transponder is placed in the drawer 352 and drawer is pushed in to the closed position. This feature is intended to eliminate the possibility of a dishonest user attempting to defeat the security by keeping the items outside the safe while simultaneously triggering the link between the detector and the transducer to cause the locking operation of the safe. Thus, the detection link is preferably designed to prevent the possibility of devices such as waveguides, light pipes, extension wires, mirrors, repeaters, etc. being used to cause the detector to decide that the items to be protected are in the secured location when they are not.

One example of preventing such deceptive tricks is to develop the communications between the detector and the transponder to be optical in nature so as to be highly directional. For instance, the transmission of the signals may be in the infrared band, and the detector may be located such that it can only receive or transmit signals over a very narrow angle. Another example is to set the power of communications between the detector 356 and the transponder 390 such that the communications are short in range, thus preventing the reception of deceptive signals sent over a long distance. This can be accomplished by either reducing the transmission powers of the detector 356 and transponder 390, or reducing their reception sensitivity. In this regard, the effective detection range for the detector 356 to sense the presence of the transponder 390 should be set according to the distance from the detector to the expected storage location of the items in the safe. For instance, for a small safe less than 1 cubit-foot in volume, a short detection range of several inches may be used, while in a large safe the detection range should be increased accordingly while still kept sufficiently short to prevent the detector from being able to sense the transponder when the latter is outside the safe. The high directionality of the transmission can be combined with the short communication range to enhance the effectiveness of the spoof prevention.

Once the presence of the items 353 to be protected in the secured location is detected, the electronic lock control circuit 363 actuates the lock 355 of the safe 350, thereby locking the items inside the safe. As part of the locking operation, an audit trail record is created for the storing and locking event. The audit trail data can be produced and stored either at the beginning or at the end of the lock event, and typically may include the time and date of the event. If a location device, such as a monitoring device 320 with a GPS sensor, is attached to the items, the location data can also be stored as part of the audit trail record. The audit trail record may be stored into the memory 382 of the lock control circuit of the safe. Alternatively, the audit trail record may be stored into a memory of the monitoring device 320, if the transponder is part of the monitoring device.

The detector 356 can monitor the item being locked in the safe before, during, and after the locking event to confirm that the items 353 are indeed in the safe when the safe is locked.

After the items 353 are successfully locked in the safe, it may be advantageous to constantly or intermittently confirm that the items remain in safe while the safe is locked. For example, this may be accomplished by (a) the detector 356 maintaining constant or intermittent detection of the transponder 390, (b) the transponder maintaining constant or intermittent signaling to the detector, or (c) the transponder maintaining constant or intermittent detection of the detector. This feature will further discourage a dishonest person from rigging up an apparatus to trick the safe into locking without the items in it, because even if the safe can be somehow tricked into locking, the subsequent reconfirmation operation will show that the items are actually missing from the safe, and as a result audit trail records will be logged to alert an auditor of the records the breech of security.

Optionally, a monitoring device 320, like the one used in embodiment of FIG. 24, can be attached to the items being protected to detect any unusual event while the items are in the safe. The monitoring device 320 is placed in a monitoring mode in which it monitors the states of its activity sensors in addition to the GPS sensor. For example, if the motion detection sensor of the monitoring device senses movement, the monitoring device 320 can communicate with the detector 356 to ensure that it is still locked in the safe (i.e., the detector can still detect its presence).

If at any time the communication between the detector and the transponder is lost or missing after the safe is locked, the electronics of the safe lock may log an audit trail record to indicate that event. Alternatively, if the transponder is part of the monitoring device 320 or has a communication link with the monitoring device, the monitoring device may log an audit trail record in its memory if the communication link between the detector and the transponder is broken. In addition, the safe lock electronics 363 or the monitoring device 320 can transmit an alarm signal, such as an audio alert signal for alerting a local user or a wireless signal transmitted to a remote monitoring station, to indicate a possible breech of security.

To determine the timing of the access/locking events for generating the audit trail data, the lock control circuit 363 may include a clock 386. The clock is optional because the time information may be provided by the transponder 390, and/or by an external assess control device such as the electronic key 358 used to access the safe, and the time data may be transferred to the electronic lock circuit 363 of the safe during a communication event. Thus, the safe is not required to keep and maintain a clock in its electronic lock control circuit.

The transponder 390 and the electronic key 358 used to access the safe need to be synchronized or linked to the safe lock, so that duplicate devices (i.e. other transponders or keys) cannot be substituted in their place to overcome the security of the system. To that end, in one implementation, each transponder contains a unique identification (ID) code, such as a serial number. This unique ID code is "learned" by the electronic lock circuit of the safe during a setup operation, in which the ID code is transferred to the lock circuit and stored in the lock memory. Similarly, another unique ID code is assigned to the electronic key 358, and that code is also transferred to the lock memory during the setup operation. The code transfer process may be initiated by the user pressing a learn button 385 to put the lock control circuit 363 in a learn mode, and the electronic key and transponder are then actuated to wirelessly transmit their access codes, including the respective ID codes, to the lock circuit. Alternatively, the access codes of the electronic key and transponder may be transferred to the lock control circuit of the safe via the communication port 394. Alternatively or additionally, it is also possible to synchronize or link the transponder and the electronic key to the safe lock by transferring the codes from the safe lock to the transponder and the electronic key.

Thereafter, the ID codes learned into the lock memory will allow the safe lock control circuit to work only with those particular devices identified by those codes. When the detector 356 receives transmissions from a transponder 390, the lock control circuit compares the ID number in the received transmissions with the ID numbers stored in the lock memory. If no match is found, it is an indication that an unauthorized transponder is being used, and the safe will not trigger a locking event. In addition, the safe stores an audit trail record in the memory to indicate the detection of an unauthorized transponder. In this regard, the safe may store in the lock memory an audit trail record each time it detects a transponder when it is in the unlocked state, regardless of whether the transponder has been properly registered with the lock circuit.

In accordance with a feature of one embodiment of the invention, the safe is provided with the capability to display or read out from the lock electronics information regarding the items locked inside the safe. The information to be read out may be, for example, a code, ID number, or name associated with the transponder that is attached to the items being protected. The information display may use the display component 334 of the lock control circuit, while the information readout may be through the communication port 331 or the wireless communication component 332. This feature is useful in a situation where a plurality of these safes are at a location and a person wants to retrieve a particular item but cannot tell which safe contains that item. Displaying or otherwise providing the information identifying the contents of the safes eliminates the need for the user to resort to the trial-and-error process of unlocking the safes until the item is found.

Figure 28:
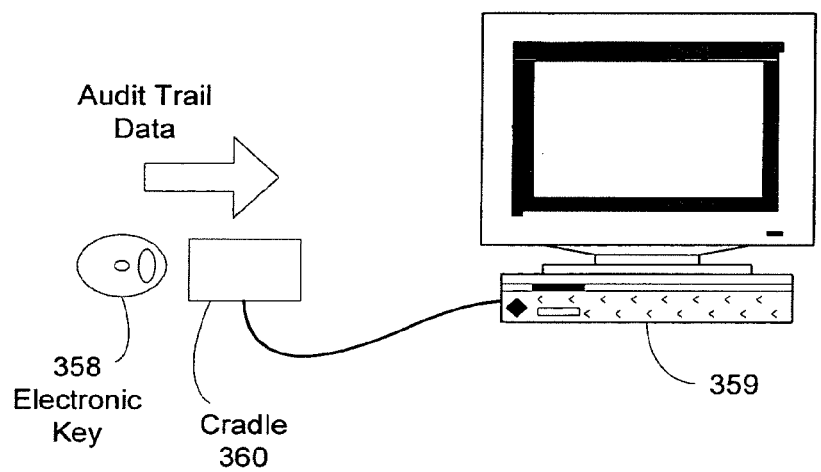
FIG. 28 is a schematic view showing an electronic key downloading audit trail records collected from the safe in the embodiment of FIGS. 25A-C to a computer.
Figure 29:
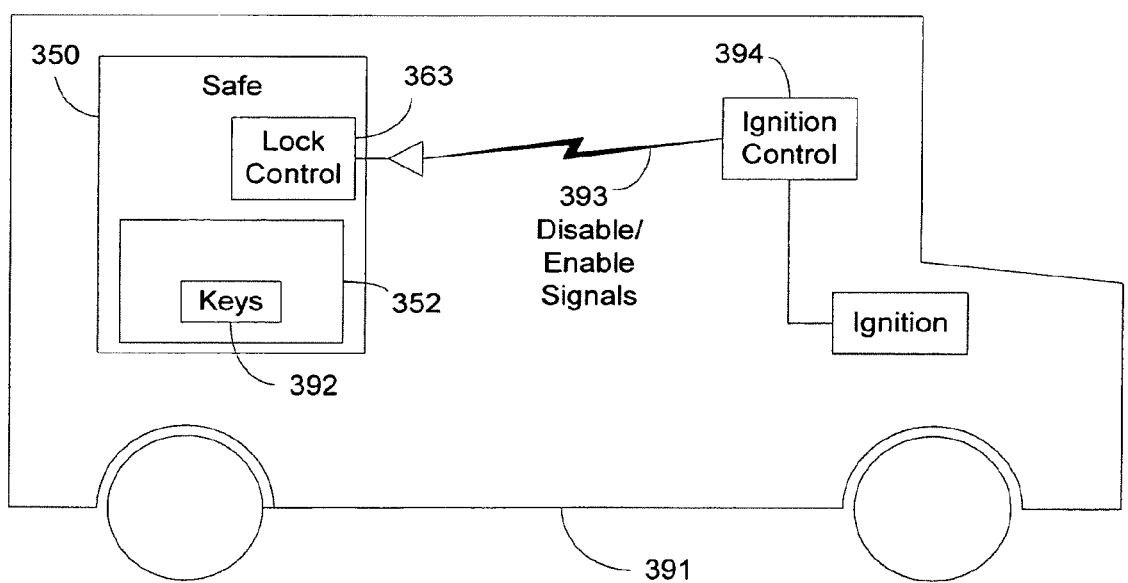
FIG. 29 is a schematic view showing an embodiment in which a safe transmits signals to disable or enable the ignition of vehicle.

When a user wants to retrieve the items 353 stored in the safe, he needs to use an appropriate access control device to unlock the safe. For example, the safe lock may interface with an electronic key 358 similar to the way an electronic key is used to access vending machines as described in earlier embodiments. The electronic key 358 can be used to receive from the safe lock the audit trail records stored in the lock memory 328, and store the retrieved records in its own memory. Later, as shown in FIG. 28, the audit trail records can be downloaded from the electronic key 358 to a computer 359 for sorting, viewing, and auditing purposes when the electronic key is returned to a key refresh station and placed in a cradle 360 connected to the computer. Like the electronic keys for vending machines, the electronic key 358 for the safe 350 can also be given operation limit parameters to restrict the use of the key to access the safe and the items to be protected by the safe.

In an alternative embodiment, the operation of the external electronic key 358 can also be used to trigger the locking operation of the safe once the items are placed in the secured location. The user first places the items to be protected at the secured location where the detector can detect the presence of the transponder attached to the items. In the embodiment shown in FIG. 25B, this means placing the items with the transponder in the drawer and then closing the drawer. Next, the external key 358 communicates with the receiver of the electronic lock of the safe to trigger the locking operation. In response to the trigger signal from the key, the safe 350 locks the drawer 352 only if the detector 356 senses the presence of the transponder 390 in the secured location. In other words, instead of automatically locking itself upon detection of the items 353, the safe will wait for the trigger signal sent by the electronic key. This additional step would ensure that the electronic key 358 is outside the safe when the locking event takes place, thus preventing the user from accidentally putting the electronic key 358 with the items 353 to be protected in the drawer and locking them together in the safe. The trigger signal may also cause the safe lock circuit 363 to transfer the audit trail records for locking and unlocking events to the electronic key 358.

In another embodiment of the invention, the lock control circuit is configured to provide enable and disable signals for an external device depending on the status of the safe. For example, in a vending route drive application, mechanical or electronic keys are given to the driver of an assigned route. The safe 350 may be placed inside the vehicle 391 driven by the driver for temporary storage of the keys 392 when the driver moves from one vending machine site to the next. In that case, the safe lock circuit 363 may be configured to transmit signals 393 to the ignition control circuit 394 of the vehicle to enable or disable the ignition of the vehicle. When the driver arrives at a vending machine site, he unlocks the safe 350 to take the vending machine keys 392 out of the safe so that they can be used to access the vending machines. In response to the unlocking event, the safe lock circuit 363 transmits a disable signal to the vehicle ignition control circuit 394 to disable the ignition. Later, when the driver returns the keys 392 to the safe, the safe lock circuit determines that the keys are indeed put back in the safe, locks the safe, and then transmits an enable signal to the vehicle ignition control circuit 394 to enable the ignition. The route driver can then start the vehicle 391 and drive it to the next vending machine site. Since the ignition is disabled if the keys are not in the safe, the route driver will not be able to operate the vehicle unless the keys are returned to the safe. In this way, if the driver forgets to take the keys after accessing the vending machines, he will be reminded of it since the vehicle will be inoperable.

Figure 30:
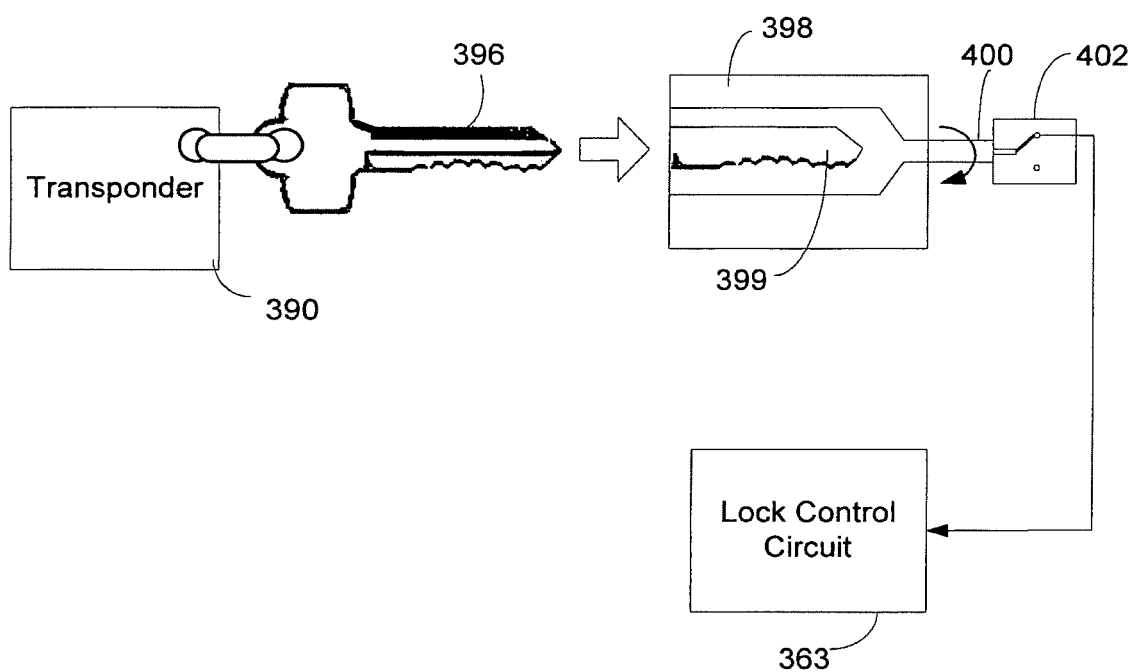
FIG. 30 is a schematic diagram showing an alternative embodiment of a security container for securely storing mechanical keys.

In an alternative embodiment designed for securing mechanical keys, in addition to using a transponder 390 to facilitate detection of the keys in a security container, mechanical means is used to further ensure that the mechanical keys are properly placed inside the security container. As shown in FIG. 30, for a mechanical key 396 to be stored in the safe, a mechanical lock plug 398 is provided in the safe for interfacing with that key. The lock plug is secured in the drawer 352 (see FIG. 25) of the safe 350. The lock plug 398 has a slot 399 configured for receiving the blade of the corresponding mechanical key 396. To secure the mechanical key, the key 396 is inserted into the slot 399 of the lock plug 398 and rotated by a pre-determined angle, such as 180 degrees, into a storage position. The lock plug 398 is configured such that the key 396 in the rotated position cannot be removed from the lock plug. The lock plug 398 has a shaft 400 that is rotated when the key is turned. The shaft 400 is coupled to an electrical switch 402 such that the switch is closed when the key is rotated to the storage position. The electrical switch 402 is linked to the electronic lock control circuit 363 of the safe so that the lock control circuit can detect whether the switch is closed or open. A closed switch is an indication that the mechanical key 396 correspond to the lock plug 398 has been inserted into the lock plug and rotated to the storage position in which the key cannot be removed. The safe may have multiple lock plugs for different mechanical keys, and the lock control electronics of the safe may be configured to require that each of the switches associated with the lock plugs has been put in the closed position, i.e., all the corresponding mechanical keys have been inserted into the respective lock plugs and rotated to the stored position, before the lock can be actuated. The lock control circuit may further require the detection of the transponder 390 in the drawer in the closed position as an additional condition for locking. Once these conditions are detected, the electronic lock circuit of the safe actuates the lock, either automatically or in response to a trigger from an external device such as the electronic key used to unlock the safe.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. An electronic security system, comprising: a secured enclosure including a safe or a vending machine; an electronic detection circuit for detecting authorized and unauthorized access events; a closure having a storage area for containing an item to be protected, the closure being movable to an open position for accessing the item and a closed position in which the item contained in the closure is not accessible; a first detector limited in distance and in direction configured to detect an item within substantially less than the storage area of the closure, the first detector detecting an identification value of the item as the item is being positioned and secured in a select area of the closure, and storing in a memory a first record comprising the identification value of the item being protected in the closure while the closure is in the closed position; a second detector configured to detect authorized and unauthorized accessing of the closure and storing in a memory a second record, after the storing of the first record, the second record comprising an identification code associated with one of either the authorized or the unauthorized closure access event; a data storage and communication device comprising an identification number and one of either the first or the second record, configured to perform, at least in part, a network communication operation between a plurality of communication devices comprising at least one of either the first record and the second record, and a signal produced in a first location to initiate transfer of one of either the first record or the second record between the data storage and communication device in the first location and a communication device or a database in a second location, wherein the transfer includes a value corresponding to a time or date associated with one of either the first record or second record to the database; a processor located remote to the secured enclosure and employing an operating system for operating a plurality of tasks, wherein at least one task is a software program for record data management; a database pointer comprising a database path identification; and a database selected via the database path identification, said database comprising item identification values and access identification codes; wherein the software program includes computer-executable instructions for performing, at least in part, a data transfer operation, said operation comprising the steps of: selecting the database via the database path identification and communicating at least one of the first record and the second record with the database; identifying a record stored in the database associated with an unauthorized access event; and transmitting one of either an email or a text message containing the identification parameter of a lock or a closure or an item that was subject to the unauthorized access event to a device remote to the secured enclosure.

2. The system of claim 1, wherein a value corresponding to a time or date associated with both the first record and the second record is communicated.

3. The system of claim 1, wherein an authorization code or password is compared to a stored code prior to allowing the storage of the database path identification into a database pointer.

4. The system of claim 1, wherein one of either the first record or the second record is limited to data storage into the database selected via the database pointer.

5. The system of claim 1, wherein an authorization code or password is compared to a stored code prior to allowing storage of a closure name into the database.

6. The system of claim 1, wherein the data record storage task and the network communication task operate in an order based on priority.

7. The system of claim 1, wherein the unauthorized access event record identification/sorting task and the network communication task operate in an order based on priority.

8. The system of claim 1, wherein the data record viewing/management task and the network communication task operate in an order based on priority.

9. The system of claim 1, wherein the data transfer operation of the first record is a periodically scheduled task.

10. The system of claim 1, wherein records communicated via the communication device are limited to data storage into the database selected via the database pointer.

11. An electronic security system, comprising: a secured enclosure including a safe or a vending machine; a lock; an electronic lock control circuit for controlling operations of the lock and for identifying authorized and unauthorized lock access events; a closure having a storage area for containing an item or items to be protected, the closure being movable to an open position for accessing the item and a closed position in which the item contained in the closure is not accessible; a first detector limited in distance and in direction configured to detect an item within substantially less than the storage area of the closure, the first detector detects an identification value of the item as the item is being positioned and secured in a select area of the closure, and storing in a memory a first record comprising the identification value of the item being protected in the closure while the closure is in the closed position; wherein the electronic lock control circuit is configured to actuate the lock to unlock the closure upon receiving an access signal; a second detector configured to detect authorized and unauthorized accesses of the closure, and storing in a memory, a second record stored after the storing of the first record, the second record comprising an identification code associated with one of either the authorized or unauthorized closure access event; a data storage and communication device comprising an identification number and one of either the first record or the second record, configured to perform, at least in part, a network communication operation between a plurality of communication devices comprising at least one of the first record and the second record, and a signal produced in a first location to initiate the transfer of one of either the first record or the second record between the data storage and communication device in the first location and a communication device or a database in a second location; a processor located remote to the secured enclosure and employing an operation system for operating a plurality of tasks, wherein at least one task is a software program for record data management; a database pointer comprising a database path identification; and a database selected via the database path identification, said database comprising item identification values and access identification codes; wherein the software program includes computer-executable instructions for performing, at least in part, a data transfer operation, said operation comprising the steps of: selecting the database via the database path identification and communicating at least one of the first record and the second record with the database; identifying a record stored in the database associated with an unauthorized access event; and transmitting one of either an email or a text message containing the identification parameter of a lock or a closure or an item that was subject to the unauthorized access event to a device remote to the secured enclosure.

12. The system of claim 11, wherein an authorization code or password is compared to a stored code prior to allowing the storage of the database path identification into a database pointer.

13. The system of claim 11, wherein one of either the first record or the second record is limited to data storage into the database selected via the database pointer.

14. The system of claim 11, wherein an authorization code or password is compared to a stored code prior to allowing storage of a closure name into the database.

15. The system of claim 11, wherein the data record storage task and the network communication task operate in an order based on priority.

16. The system of claim 11, wherein the unauthorized access event record identification/sorting task and the network communication task operate in an order based on priority.

17. The system of claim 11, wherein the data record viewing/management task and the network communication task operate in an order based on priority.

18. The system of claim 11, wherein the data transfer operation of the first record is a periodically scheduled task.

19. The system of claim 11, wherein records communicated via the communication device are limited to data storage into the database selected via the database pointer.

20. An electronic security system, comprising: a secured enclosure including a safe or a vending machine; an electronic detection system for detecting authorized and unauthorized access events; a closure having a storage area for containing an item to be protected, the closure being movable to an open position for accessing the item and a closed position in which the item contained in the closure is not accessible; a first detector limited in distance and in direction configured to detect an item within substantially less than the storage area of the closure, the first detector detecting an identification value of the item as the item is being positioned and secured in a select area of the closure, and storing in a memory a first record comprising the identification value of the item being protected in the closure while the closure is in the closed position; a second detector configured to detect the authorized and unauthorized accessing of the closure and storing in a memory a second record, stored after the storing of the first record, the second record comprising an identification code associated with one of either the authorized or the unauthorized closure access event; a data storage and communication device enabled and disabled for data storage operation, comprising an identification number and one of either the first record or the second record, configured to perform, at least in part, a network communication operation between a plurality of communication devices comprising at least one of the first record and the second record, and a signal produced in a first location to initiate the transfer of one of either the first record or the second record between the data storage and communication device in the first location and a communication device in a second location; a processor located remote to the secured enclosure and employing an operating system for operating a plurality of tasks, wherein at least one task is a software program for record data management; a database pointer comprising a database path identification; and a database selected via the database path identification, said database comprising item identification values and access identification codes; wherein the software program includes computer-executable instructions for performing, at least in part, a data transfer operation, said operation comprising the steps of: selecting the database via the database path identification and communicating the first record or the second record with the database; identifying a record stored in the database associated with an unauthorized access event; transmitting one of either an email or a text message containing the identification parameter of a lock or a closure or an item that was subject to an unauthorized access event to a device remote to the secured enclosure; and initiating communication of an enable signal from the communication device or database in the second location to the data storage and communication device in the first location.

21. The system of claim 20, wherein an authorization code or password is compared to a stored code prior to allowing the storage of the database path identification into a database pointer.

22. The system of claim 20, wherein one of either the first record or the second record is limited to data storage into the database selected via the database pointer.

23. The system of claim 20, wherein records communicated via the communication device are limited to data storage into the database selected via the database pointer.

24. The system of claim 20, wherein the data record storage task and the network communication task operate in an order based on priority.

25. The system of claim 20, wherein the unauthorized access event record identification/sorting task and the network communication task operate in an order based on priority.

26. The system of claim 20, wherein the data record viewing/management task and the network communication task operate in an order based on priority.

27. The system of claim 20, wherein the data transfer operation of the first record is a periodically scheduled task.

28. The system of claim 20, wherein an authorization code or password is compared to a stored code prior to allowing storage of a closure name into the database.

29. An electronic security system, comprising: a secured enclosure including a safe or a vending machine; an electronic detection system for detecting authorized and unauthorized access events; a closure having a storage area for containing an item to be protected, the closure being movable to an open position for accessing the item and a closed position in which the item contained in the closure is not accessible; a first detector limited in distance and in direction configured to detect an item within substantially less than the storage area of the closure, the first detector detects an identification value of the item as the item is being positioned and secured in a select area of the closure, and stores in a memory a first record comprising the identification value of the item being protected in the closure while the closure is in the closed position; a second detector configured to detect the authorized and unauthorized accessing of the closure and storing in a memory a second record, stored after the storing of the first record, the second record comprising an identification code associated with either the authorized or the unauthorized closure access event; a third detector for detecting one or more conditions involving one of either the closure of the item, and storing in a memory a third record, stored after the storing of the first record, the third record comprising a value or condition associated with one of either the closure of the item; a data storage and communication device enabled and disabled for data storage operation, comprising an identification number and one of either the first record, the second record or the third record, configured to perform, at least in part, a network communication operation between a plurality of communication devices comprising at least one of the first record, the second record, and the third record, and a signal produced in a first location to initiate the transfer of one of either the first record or the second records between the data storage and communication device in the first location and a communication device in a second location; a processor located remote to the secured enclosure and employing an operating system for operating a plurality of tasks, wherein at least one task is a software program for record data management; a database pointer comprising a database path identification; and a database selected via the database path identification, said database comprising item identification values and access identification codes; wherein the software program includes computer-executable instructions for performing, at least in part, a data transfer operation, said operation comprising the steps of: selecting the database via the database path identification and communicating at least one of the first record and the second record with the database; identifying a record stored in the database associated with an unauthorized access event; and transmitting one of either an email or a text message containing the identification parameter of a lock or a closure or an item that was subject to an unauthorized access event to a device remote to the secured enclosure.

30. The system of claim 29, wherein an authorization code or password is compared to a stored code prior to allowing the storage of the database path identification into a database pointer.

31. The system of claim 29, wherein one of either the first record or the second record is limited to data storage into the database selected via the database pointer.

32. The system of claim 29, wherein an authorization code or password is compared to a stored code prior to allowing storage of a closure name into the database.

33. The system of claim 29, wherein the data record storage task and the network communication task operate in an order based on priority.

34. The system of claim 29, wherein the unauthorized access event record identification/sorting task and the network communication task operate in an order based on priority.

35. The system of claim 29, wherein the data record viewing/management task and the network communication task operate in an order based on priority.

36. The system of claim 29, wherein the data transfer operation of the first record is a periodically scheduled task.

37. The system of claim 29, wherein records communicated via the communication device are limited to data storage into the database selected via the database pointer.

38. An electronic security system, comprising: a secured enclosure including a safe or a vending machine; an electronic detection system for detecting authorized and unauthorized access events; a closure having a storage area for containing an item to be protected and being in a first location, the closure being movable between an open position for accessing the item and a closed position in which the item contained in the closure is not accessible; a first detector limited in distance and in direction configured to detect an item within substantially less than the storage area of the closure, the first detector detecting an identification value of the item as the item is being positioned and secured in a select area of the closure, and storing in a memory a first record comprising the identification value of the item being protected in the closure while the closure is in the closed position; a second detector configured to detect the authorized and unauthorized accessing of the closure and storing in a memory, a second record stored after the storing of the first record, the second record comprising an identification code associated with one of either the authorized or the unauthorized closure access event; a third record stored in the first location and comprising at least one identification number associated with the closure and one of either a customer name or location name; a data storage and communication device enabled and disabled for data storage operation, comprising an identification number and one of either the first record, the second record or the third record, configured to perform, at least in part, a network communication operation between a plurality of communication devices comprising at least one of the first record, the second record, and the third record, and a signal produced in the first location to initiate the transfer of at least one of the first record and the second record between the data storage and communication device located in the first location and a communication device in a second location; a processor located remote to the secured enclosure and employing an operating system for operating a plurality of tasks, wherein at least one task is a software program for record data management; a database pointer comprising a database path identification; and a database selected via the database path identification, said database comprising item identification values and access identification codes; wherein the software program includes computer-executable instructions for performing, at least in part, a data transfer operation, said operation comprising the steps of: selecting the database via the database path identification and communicating at least one of the first record and the second record with the database; identifying a record stored in the database associated with an unauthorized access event; and transmitting one of either an email or a text message containing the customer name or location of a closure or an item that was subject to an unauthorized access event to a device remote to the secured enclosure.

39. The system of claim 38, wherein a value corresponding to a time or date associated with the third record is communicated.

40. The system of claim 38, wherein an authorization code or password is compared to a stored code prior to allowing the storage of the database path identification into a database pointer.

41. The system of claim 38, wherein one of either the first record or the second record is limited to data storage into the database selected via the database pointer.

42. The system of claim 38, wherein an authorization code or password is compared to a stored code prior to allowing storage of a closure name into the database.

43. The system of claim 38, wherein the data record storage task and the network communication task operate in an order based on priority.

44. The system of claim 38, wherein the unauthorized access event record identification/sorting task and the network communication task operate in an order based on priority.

45. The system of claim 38, wherein the data record viewing/management task and the network communication task operate in an order based on priority.

46. The system of claim 38, wherein the data transfer operation of the first record is a periodically scheduled task.

47. The system of claim 38, wherein records communicated via the communication device are limited to data storage into the database selected via the database pointer.

* * * * *